US012613304B2

(12) United States Patent　　　　　　(10) Patent No.: US 12,613,304 B2
Yang et al.　　　　　　　　　　　　　　(45) Date of Patent: Apr. 28, 2026

(54) RADAR SYSTEM

(71) Applicant: SHENZHEN YINWANG INTELLIGENT TECHNOLOGIES CO., LTD., Shenzhen (CN)

(72) Inventors: Chen Yang, Beijing (CN); Jinnan Liu, Shenzhen (CN); Jiamin Chen, Beijing (CN); Pei Liu, Beijing (CN)

(73) Assignee: SHENZHEN YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 1116 days.

(21) Appl. No.: 17/554,605

(22) Filed: Dec. 17, 2021

(65) Prior Publication Data

US 2022/0107390 A1　　Apr. 7, 2022

Related U.S. Application Data

(63) Continuation of application No. PCT/CN2019/092084, filed on Jun. 20, 2019.

(51) Int. Cl.
　　*G01S 7/00*　　　　(2006.01)
　　*G01S 13/34*　　　(2006.01)
　　*G01S 13/87*　　　(2006.01)
　　*G01S 13/931*　　(2020.01)
(52) U.S. Cl.
　　CPC .............. *G01S 7/003* (2013.01); *G01S 13/34* (2013.01); *G01S 13/87* (2013.01); *G01S 13/931* (2013.01)
(58) Field of Classification Search
　　CPC .......... G01S 7/003; G01S 13/34; G01S 13/87; G01S 13/931; G01S 13/584
　　See application file for complete search history.

(56) References Cited

U.S. PATENT DOCUMENTS

| 5,412,414 A | 5/1995 | Ast et al. |
| 9,448,300 B2 | 9/2016 | Jansen et al. |
| 2003/0210172 A1* | 11/2003 | Pleva ..................... H01Q 13/18 342/72 |
| 2005/0060069 A1 | 3/2005 | Breed et al. |
| 2005/0156780 A1 | 7/2005 | Bonthron et al. |

(Continued)

FOREIGN PATENT DOCUMENTS

| CN | 104459669 A | 3/2015 |
| CN | 106814353 A | 6/2017 |

(Continued)

OTHER PUBLICATIONS

Qiao, S., "Motor vehicle speed measurement and measurement technology," China Quality Inspection Press, Jan. 1, 2013, with an English Summary, 3 pages.

*Primary Examiner* — Matthew M Barker
(74) *Attorney, Agent, or Firm* — Conley Rose, P.C.

(57)　　　　　　ABSTRACT

A radar system includes a first radar sensor comprising a data combination system and a plurality of radar monolithic chips, wherein each radar monolithic chip includes a first radio frequency front end and a first microprocessor. The first microprocessor is configured to preprocess echo data obtained by the first radio frequency front end. The data combination system is configured to combine and transmit the preprocessed echo data, wherein a processor performs post-processing on the preprocessed echo data to generate point cloud data of the radar system.

20 Claims, 8 Drawing Sheets

(56) References Cited

U.S. PATENT DOCUMENTS

| | | | |
|---|---|---|---|
| 2010/0127915 A1 | 5/2010 | Klotzbuecher et al. | |
| 2010/0277297 A1* | 11/2010 | Eckel | G01S 7/526 |
| | | | 340/435 |
| 2012/0083974 A1* | 4/2012 | Sandblom | A61B 5/163 |
| | | | 702/19 |
| 2015/0153445 A1 | 6/2015 | Jansen | |
| 2016/0018511 A1 | 1/2016 | Nayyar | |
| 2017/0054449 A1 | 2/2017 | Mani et al. | |
| 2017/0254880 A1* | 9/2017 | Smith | G01S 13/87 |
| 2017/0293025 A1 | 10/2017 | Davis et al. | |
| 2018/0113209 A1 | 4/2018 | Campbell | |
| 2019/0041494 A1 | 2/2019 | Roger et al. | |
| 2020/0233079 A1 | 7/2020 | Silverstein et al. | |
| 2022/0146661 A1* | 5/2022 | Zhu | G01S 13/872 |

FOREIGN PATENT DOCUMENTS

| | | | | |
|---|---|---|---|---|
| CN | 108020837 A | 5/2018 | | |
| CN | 108170373 A | 6/2018 | | |
| CN | 108287335 A | 7/2018 | | |
| CN | 207636770 U | 7/2018 | | |
| CN | 108700645 A | 10/2018 | | |
| CN | 109001688 A | 12/2018 | | |
| CN | 109164428 A | 1/2019 | | |
| CN | 109375203 A | 2/2019 | | |
| CN | 109387814 A | 2/2019 | | |
| CN | 109444819 A | 3/2019 | | |
| CN | 109633652 A | 4/2019 | | |
| CN | 109683155 A | 4/2019 | | |
| CN | 109787759 A | 5/2019 | | |
| CN | 109844562 A | 6/2019 | | |
| CN | 109884638 A | 6/2019 | | |
| CN | 109895763 A | 6/2019 | | |
| EP | 3438693 A1 * | 2/2019 | ............ | G01S 13/26 |
| EP | 3889636 A1 | 10/2021 | | |
| WO | 2004106965 A2 | 12/2004 | | |
| WO | 2018089082 A1 | 5/2018 | | |

* cited by examiner

RADAR SYSTEM

CROSS-REFERENCE TO RELATED APPLICATIONS

This is a continuation of International Patent Application No. PCT/CN2019/092084 filed on Jun. 20, 2019, which is hereby incorporated by reference in its entirety.

TECHNICAL FIELD

This application relates to the field of radar technologies, and in particular, to a radar system.

BACKGROUND

A high-resolution in-vehicle radar is an indispensable important part in automated driving, and is used to measure a target distance and a target speed. In the field of automated driving, a radar sensor needs to provide a stronger environment awareness capability. Enlarging an array antenna scale of the radar sensor is a typical method for improving a capability of measuring an environment by the sensor. On the basis of speed measurement and distance measurement, more transmit/receive antennas can enhance a capability of distinguishing between target angles by the radar sensor. Correspondingly, a large-scale antenna array brings a requirement of a stronger data throughput, a storage requirement of more data, and a requirement of larger computing power. Therefore, subsequent signal processing and data processing capabilities also need to match a gradually improved sensor specification.

However, a location at which a radar can be installed on a vehicle body and a corresponding installation size do not continuously increase. As an antenna array scale of a radar sensor increases, a quantity of receive antennas greatly increases. In a conventional technology, if data of a plurality of radar sensors is uniformly processed by using a central processing unit, a great challenge is brought to computing power of the central processing unit. If the data is processed by using a processor at one end of the radar sensor and is then sent to the central processing unit for convergence, the processor at the end of the radar sensor quickly enters a bottleneck of a processing capability, a cache capability, and a data throughput capability. These disadvantages restrict adaptability of a radar system to a radar sensor with a large-scale antenna array.

Therefore, the foregoing problems in the conventional technology need to be resolved.

SUMMARY

Embodiments of the present disclosure provide a radar system to preprocess, using a microprocessor, data obtained by a radar sensor to reduce processing pressure of a subsequent processor, thereby improving a data processing capability of the radar system.

A first aspect of this application provides a radar system including at least one radar sensor. A first radar sensor in the at least one radar sensor includes a data combination module and M radar monolithic chips, each radar monolithic chip includes a first radio frequency unit and a first microprocessor, and M is an integer greater than one. The first microprocessor may be a radar-signal processing unit (RPU), and the radar monolithic chip may be a circuit structure including separate modules, or may be a system on chip (SoC). The first radio frequency unit is configured to receive echo data, where the echo data may be echo data of a chirp signal transmitted by the first radio frequency unit. The first microprocessor is configured to preprocess the echo data to obtain first data. The data combination module is configured to combine the first data respectively output by the M radar monolithic chips to obtain combined data of the first radar sensor. The data combination module is further configured to transmit the combined data, where the combined data is used to obtain second data of the first radar sensor after undergoing post-processing, and the second data of each of the at least one radar sensor is used to generate point cloud information of the radar system.

In this embodiment, each radar monolithic chip in the first radar sensor includes the first radio frequency unit and the first microprocessor. On each radar monolithic chip, the first microprocessor preprocesses the echo data obtained by the first radio frequency unit to obtain the first data, and sends the first data to the data combination module. The data combination module is connected to all the radar monolithic chips. After receiving the first data sent by each radar monolithic chip, the data combination module combines all the first data into the combined data. The combined data is data preprocessed by the first radar sensor. Further, the second data of the first radar sensor can be obtained simply by further processing the combined data. The radar system includes a plurality of radar sensors and the second data of all the radar sensors is used to generate point cloud data of the radar system. In the foregoing working process, the obtained echo data obtained by the first radio frequency unit is not completely processed by the microprocessor of the radar sensor, but is preprocessed by the microprocessor of the radar sensor, and then sent to a next phase for post-processing. In this way, pressure of computing power for echo data processing is jointly shared by the radar sensor and a next-level device, so as to resolve a problem that when an antenna array scale of the radar sensor increases, a processor at one end of the radar sensor quickly enters a bottleneck of a processing capability, a cache capability, and a data throughput capability, thereby improving adaptability of the radar system to a radar sensor with a large-scale antenna array.

With reference to the first aspect, in a first possible implementation, the radar system further includes a central processing unit, and the central processing unit may be a central RPU. The data combination module is further configured to transmit the combined data to the central processing unit. The central processing unit is configured to perform post-processing on the combined data to obtain the second data of the first radar sensor.

In this embodiment, the data combination module transmits the combined data to the central processing unit, and the central processing unit preprocesses the combined data to obtain the second data of the first radar sensor. As the combined data is preprocessed by the first microprocessor, the central processing unit can obtain the second data through calculation with less computing power, so that processing pressure of the central processing unit is reduced. In addition, as the transmitted combined data is preprocessed, a data throughput capability between the data combination module and the central processing unit is further improved.

With reference to the first possible implementation of the first aspect, in a second possible implementation, if a signal transmission bit width between the data combination module and the central processing unit is greater than or equal to a bit width of the combined data of the first radar sensor, the data combination module is configured to combine the first data respectively output by the M radar monolithic chips includes the data combination module is configured to package the first data respectively output by the M radar monolithic chips.

In this embodiment, the signal transmission bit width between the data combination module and the central processing unit is greater than or equal to the bit width of the combined data of the first radar sensor, that is, a transmission channel between the data combination module and the central processing unit can completely transmit the combined data of the first radar sensor. Therefore, the data combination module can send the obtained combined data to the central processing unit simply by packaging the first data respectively output by the M radar monolithic chips.

With reference to the first possible implementation of the first aspect, in a third possible implementation, if a signal transmission bit width between the data combination module and the central processing unit is less than a bit width of the combined data of the first radar sensor, the data combination module is configured to combine the first data respectively output by the M radar monolithic chips includes the data combination module is configured to convert the first data respectively output by the M radar monolithic chips from parallel data into serial data, and the data combination module is configured to cache the serial data. The data combination module is configured to transmit the combined data to the central processing unit includes the data combination module is configured to transmit the serial data to the central processing unit N times, where N is an integer greater than one.

In this embodiment, when the signal transmission bit width between the data combination module and the central processing unit is less than the bit width of the combined data of the first radar sensor, the data combination module cannot transmit the combined data to the central processing unit through a transmission channel at one time. Therefore, the data combination module needs to convert the combined data from the parallel data into the serial data and cache the serial data, and then transmits the serial data to the central processing unit several times, so that when the transmission bit width is less than the bit width of the combined data, the data combination module can transmit complete combined data to the central processing unit.

With reference to the first to the third possible implementations of the first aspect, in a fourth possible implementation, the first microprocessor is configured to preprocess the echo data to obtain first data includes the first microprocessor is configured to perform distance measurement processing on the echo data to obtain measured distance data. The data combination module is configured to combine the first data respectively output by the M radar monolithic chips, to obtain combined data of the first radar sensor includes the data combination module is configured to combine the measured distance data respectively output by the M radar monolithic chips, to obtain the combined data of the first radar sensor. The central processing unit is configured to perform post-processing on the combined data to obtain the second data of the first radar sensor includes the central processing unit is configured to perform speed measurement processing and angle measurement processing on the combined data to obtain measured speed data and measured angle data of the first radar sensor.

In this embodiment, the first microprocessor at one end of the radar sensor is configured to perform distance measurement processing on the echo data to complete a preprocessing operation, and then the central processing unit performs speed measurement processing and angle measurement processing on the data on which distance measurement processing is performed, so that the first microprocessor and the central processing unit share pressure of computing power for the echo data, thereby improving a data processing capability. In addition, because distance measurement processing is performed on the echo data, a data amount becomes smaller, thereby improving a data throughput capability.

With reference to the fourth possible implementation of the first aspect, in a fifth possible implementation, the first microprocessor is configured to perform distance measurement processing on the echo data to obtain measured distance data includes the first microprocessor is configured to perform zero padding on the echo data, the first microprocessor is further configured to perform windowing processing on the echo data obtained after zero padding, and the first microprocessor is further configured to perform fast Fourier transform on the windowed echo data to obtain first spectrum data, where the first spectrum data includes at least one first spectrum, each single frequency in the first spectrum corresponds to distance data at a detection point, and the detection point is a point in the point cloud information.

In this embodiment, the first microprocessor performs zero padding on the echo data, so that the echo data meets a processing requirement. The first microprocessor performs windowing processing on the echo data obtained after zero padding, and then performs fast Fourier transform on the windowed echo data to obtain the first spectrum data. The first microprocessor interprets the first spectrum data to obtain distance information at all detection points on the radar monolithic chip, where each single frequency in the first spectrum corresponds to distance data at a detection point. In a subsequent processing process of the central processing unit, detection points of all radar sensors form a point cloud of the radar system.

With reference to the fifth possible implementation of the first aspect, in a sixth possible implementation, the central processing unit is configured to perform speed measurement processing and angle measurement processing on the combined data to obtain measured speed data and measured angle data of the first radar sensor includes the central processing unit is configured to obtain measured speed data at each detection point based on the distance data corresponding to each single frequency in the first spectrum data.

In this embodiment, a speed at a single detection point cannot be calculated by using a distance at the detection point. Therefore, a speed at each point needs to be measured after a plurality of pieces of distance data are obtained.

With reference to the sixth possible implementation of the first aspect, in a seventh possible implementation, the central processing unit is configured to perform speed measurement processing and angle measurement processing on the combined data to obtain measured speed data and measured angle data of the first radar sensor includes the central processing unit is configured to obtain second spectrum data, where the second spectrum data is spectrum data obtained after distance measurement processing and speed measurement processing are performed on the first spectrum data, the second spectrum data includes at least one second spectrum, and the second spectrum is a spectrum obtained after distance measurement processing and speed measurement processing are performed on the first spectrum, the central processing unit is configured to accumulate all second spectrums in the second spectrum data, where the accumulation may be coherent accumulation or may be incoherent accumulation, and in all the second spectrums in the second spectrum data, the central processing unit is configured to perform fast Fourier transform on detection points at a same location in all the second spectrums to obtain measured angle data at each detection point.

In this embodiment, the first microprocessor obtains the first spectrum data after performing distance measurement processing on the echo data, and the central processing unit performs speed measurement processing on the first spectrum data to obtain the second spectrum data. Then the central processing unit accumulates all the second spectrums in the second spectrum data, and performs fast Fourier transform on the detection points at the same location in all the second spectrums to obtain the measured angle data at each detection point. In this manner, because distance measurement, speed measurement, and angle measurement are performed on all the detection points to track all the detection points, and then a target that needs to be detected is selected from the tracked detection points, a computing amount is relatively large. However, in this embodiment, a working manner in which the first microprocessor cooperates with the central processing unit can support computing power required in the working manner.

With reference to the sixth possible implementation of the first aspect, in an eighth possible implementation, the central processing unit is configured to perform speed measurement processing and angle measurement processing on the combined data to obtain measured speed data and measured angle data of the first radar sensor includes the central processing unit is configured to obtain second spectrum data, where the second spectrum data is spectrum data obtained after distance measurement processing and speed measurement processing are performed on the first spectrum data, the second spectrum data includes at least one second spectrum, and the second spectrum is a spectrum obtained after distance measurement processing and speed measurement processing are performed on the first spectrum; the central processing unit is configured to accumulate all second spectrums in the second spectrum data, where the accumulation may be coherent accumulation or may be incoherent accumulation. The central processing unit is configured to perform a two-dimensional constant false alarm ratio on the second spectrum data obtained after accumulation, to obtain a first target detection point from the detection points, where the first target detection point is some of the detection points, and in all the second spectrums in the second spectrum data, the central processing unit is configured to perform fast Fourier transform on each first target detection point to obtain measured angle data at the first target detection point.

In this embodiment, the central processing unit obtains the second spectrum data after performing speed measurement processing on the first spectrum data, accumulates all the second spectrums in the second spectrum data, and then performs the two-dimensional constant false alarm ratio on the second spectrum data obtained after accumulation to extract some detection points that need to be tracked from the detection points as first target detection points. Then the central processing unit performs fast Fourier transform on each first target detection point to obtain the measured angle data at the first target detection point. In this manner, detection is first performed, and then a point that needs to be tracked is selected by using the two-dimensional constant false alarm ratio and is tracked, so that computing power is relatively reduced.

With reference to the first to the third possible implementations of the first aspect, in a ninth possible implementation, the first radio frequency unit is further configured to send a first chirp signal, where the first chirp signal is used to perform detection. The first radio frequency unit is configured to receive echo data includes the first radio frequency unit is configured to receive a second chirp signal, where the second chirp signal is a chirp signal returned after the first radio frequency unit sends the first chirp signal.

In this embodiment, the first chirp signal transmitted by the first radio frequency unit bounces after touching an obstacle, so that the first radio frequency unit can receive the second chirp signal to perform detection.

With reference to the ninth possible implementation of the first aspect, in a tenth possible implementation, the first microprocessor is configured to preprocess the echo data to obtain first data includes the first microprocessor is configured to preprocess the second chirp signal to obtain measured distance data. The data combination module is configured to combine the measured distance data respectively output by the M radar monolithic chips to obtain the combined data of the first radar sensor includes the data combination module is configured to each time each of the M radar monolithic chips outputs measured distance data of a second digital chirp signal, combine the measured distance data respectively output by the M radar monolithic chips to obtain the combined data of the first radar sensor. The central processing unit is configured to perform post-processing on the combined data to obtain the second data of the first radar sensor includes the central processing unit is configured to when a quantity of accumulated second digital chirp signals corresponding to the measured distance data reaches one frame, perform speed measurement processing and angle measurement processing on the second digital chirp signal.

In this embodiment, each time the first radio frequency unit receives a second digital chirp signal, the first microprocessor performs one time of distance measurement processing on the second digital chirp signal, and then the data combination module combines the measured distance data of all the radar sensors in real time and sends the combined data to the central processing unit. Because a plurality of groups of measured distance data are required to measure a speed, when the quantity of accumulated second digital chirp signals corresponding to the measured distance data reaches one frame, the central processing unit performs speed measurement processing and angle measurement processing on the second digital chirp signal.

With reference to the ninth possible implementation of the first aspect, in an eleventh possible implementation, the first microprocessor is configured to preprocess the echo data to obtain first data includes the first microprocessor is configured to perform downsampling on X second digital chirp signals received by the first radio frequency unit to obtain Y third digital chirp signals, where both X and Y are positive integers greater than one, and Y is less than X.

The data combination module is configured to combine the first data respectively output by the M radar monolithic chips, to obtain combined data of the first radar sensor includes the data combination module is configured to combine the third digital chirp signals respectively output by the M radar monolithic chips to obtain the combined data of the first radar sensor.

The central processing unit is configured to perform post-processing on the combined data to obtain the second data of the first radar sensor includes the central processing unit is configured to perform post-processing on the third digital chirp signal in the combined data to obtain the second data of the first radar sensor.

In this embodiment, when a sampling quantity of the first radio frequency unit is greater than a quantity required by the radar system, the first microprocessor needs to perform downsampling on the second digital chirp signals received by the first radio frequency unit to compress an amount of data received by the first radio frequency unit, thereby meeting a working requirement of the radar system.

With reference to the first aspect and the first to the eleventh possible implementations of the first aspect, in a twelfth possible implementation, the first microprocessor is configured to preprocess the echo data to obtain first data includes the first microprocessor is configured to compress the echo data to obtain first compressed data.

The data combination module is configured to combine the first data respectively output by the M radar monolithic chips, to obtain combined data of the first radar sensor includes the data combination module is configured to combine the first compressed data respectively output by the M radar monolithic chips, to obtain compressed combined data of the first radar sensor.

The central processing unit is configured to perform post-processing on the combined data includes the central processing unit is configured to decompress the compressed combined data.

In this embodiment, after performing distance measurement processing on the echo data, the first microprocessor further compresses the measured distance data, so that the data combination module combines and transmits the compressed data, thereby reducing pressure of data transmission between the data combination module and the central processing unit, and improving a data throughput capability.

It can be learned from the foregoing technical solutions that the embodiments of this application have the following advantages:

In this embodiment of the present disclosure, a radar system is provided, which may be applied to an in-vehicle radar in automated driving, such as an in-vehicle millimeter-wave radar. The radar system includes at least one radar sensor, a first radar sensor in the at least one radar sensor includes a data combination module and M radar monolithic chips, each radar monolithic chip includes a first radio frequency unit and a first microprocessor, and M is an integer greater than one. The first radio frequency unit is configured to receive echo data. The first microprocessor is configured to preprocess the echo data to obtain first data. The data combination module is configured to combine the first data respectively output by the M radar monolithic chips, to obtain combined data of the first radar sensor. The data combination module is further configured to transmit the combined data, where the combined data is used to obtain second data of the first radar sensor after undergoing post-processing, and the second data of each of the at least one radar sensor is used to generate point cloud information of the radar system. In this embodiment, through task division between the first microprocessor and the central processing unit, the system can be compatible with a radar sensor with a larger-scale antenna array and can be adaptive to different system parameters and algorithm processing procedures. Both computing power burden of the microprocessor and the central processing unit and hardware resource burden are correspondingly reduced, and resource allocation is more proper. In addition, processing efficiency is improved because the microprocessor and the central processing unit work together.

A second aspect of this application provides a radar system including at least one radar sensor. A first radar sensor in the at least one radar sensor includes a first microprocessor and at least one first radio frequency unit, and the first microprocessor may be a (RPU. The at least one first radio frequency unit is configured to receive at least one piece of echo data, where the echo data may be echo data of a chirp signal transmitted by the first radio frequency unit. The first microprocessor is configured to preprocess the at least one piece of echo data to obtain first data. The first microprocessor is further configured to transmit the first data, where the first data is used to obtain second data of the first radar sensor after undergoing post-processing, and the second data of each of the at least one radar sensor is used to generate point cloud information of the radar system.

In this embodiment, the first radar sensor includes the first microprocessor and the at least one first radio frequency unit. The first microprocessor preprocesses the echo data obtained by the first radio frequency unit to obtain the first data, and transmits the first data to a next-level processor. Subsequently, the second data of the first radar sensor can be obtained simply by further processing the first data. The radar system includes a plurality of radar sensors, and the second data of all the radar sensors is finally used to generate point cloud data of the radar system. In the foregoing working process, the obtained echo data obtained by the first radio frequency unit is not completely processed by the first microprocessor of the radar sensor, but is preprocessed by the first microprocessor of the radar sensor, and then sent to a next phase for post-processing. In this way, pressure of computing power for echo data processing is jointly shared by the radar sensor and a next-level device, so as to resolve a problem that when an antenna array scale of the radar sensor increases, a processor at one end of the radar sensor quickly enters a bottleneck of a processing capability, a cache capability, and a data throughput capability, thereby improving adaptability of the radar system to a radar sensor with a large-scale antenna array.

With reference to the second aspect, in a first possible implementation, the radar system further includes a central processing unit, and the central processing unit may be a central RPU. The first microprocessor is further configured to transmit the first data to the central processing unit. The central processing unit is configured to perform post-processing on the first data to obtain the second data of the first radar sensor.

In this embodiment, the first microprocessor transmits the first data to the central processing unit, and the central processing unit preprocesses the first data to obtain the second data of the first radar sensor. Because the first data is preprocessed by the first microprocessor, the central processing unit can obtain the second data through calculation with less computing power, so that processing pressure of the central processing unit is reduced. In addition, because the transmitted first data is preprocessed, a data throughput capability between the first microprocessor and the central processing unit is further improved.

With reference to the first possible implementation of the second aspect, in a second possible implementation, the first microprocessor is configured to preprocess the echo data to obtain first data includes the first microprocessor is configured to perform distance measurement processing on the echo data to obtain measured distance data. The central processing unit is configured to perform post-processing on the first data to obtain the second data of the first radar sensor includes the central processing unit is configured to perform speed measurement processing and angle measurement processing on the first data to obtain measured speed data and measured angle data of the first radar sensor.

In this embodiment, the first microprocessor is configured to perform distance measurement processing on the echo data to complete a preprocessing operation, and then the central processing unit performs speed measurement processing and angle measurement processing on the data on which distance measurement processing is performed, so that the first microprocessor and the central processing unit share pressure of computing power for the echo data, thereby improving a data processing capability. In addition, because distance measurement processing is performed on the echo data, a data amount becomes smaller, thereby improving a data throughput capability.

With reference to the second possible implementation of the second aspect, in a third possible implementation, the first microprocessor is configured to perform distance measurement processing on the echo data to obtain measured distance data includes the first microprocessor is configured to perform zero padding on the echo data, the first microprocessor is further configured to perform windowing processing on the echo data obtained after zero padding, and the first microprocessor is further configured to perform fast Fourier transform on the windowed echo data to obtain first spectrum data, where the first spectrum data includes at least one first spectrum, each single frequency in the first spectrum corresponds to distance data at a detection point, and the detection point is a point in the point cloud information.

In this embodiment, the first microprocessor performs zero padding on the echo data, so that the echo data meets a processing requirement. The first microprocessor performs windowing processing on the echo data obtained after zero padding, and then performs fast Fourier transform on the windowed echo data to obtain the first spectrum data. The first microprocessor interprets the first spectrum data to obtain distance information at all detection points on the radar monolithic chip, where each single frequency in the first spectrum corresponds to distance data at a detection point. In a subsequent processing process of the central processing unit, detection points of all radar sensors form a point cloud of the radar system.

With reference to the third possible implementation of the second aspect, in a fourth possible implementation, the central processing unit is configured to perform speed measurement processing and angle measurement processing on the first data to obtain measured speed data and measured angle data of the first radar sensor includes the central processing unit is configured to obtain measured speed data at each detection point based on the distance data corresponding to each single frequency in the first spectrum data.

In this embodiment, a speed at a single detection point cannot be calculated by using a distance at the detection point. Therefore, a speed at each point needs to be measured after a plurality of pieces of distance data are obtained.

With reference to the fourth possible implementation of the second aspect, in a fifth possible implementation, the central processing unit is configured to perform speed measurement processing and angle measurement processing on the first data to obtain measured speed data and measured angle data of the first radar sensor includes the central processing unit is configured to obtain second spectrum data, where the second spectrum data is spectrum data obtained after distance measurement processing and speed measurement processing are performed on the first spectrum data, the second spectrum data includes at least one second spectrum, and the second spectrum is a spectrum obtained after distance measurement processing and speed measurement processing are performed on the first spectrum, the central processing unit is configured to accumulate all second spectrums in the second spectrum data, where the accumulation may be coherent accumulation or may be incoherent accumulation, in all the second spectrums in the second spectrum data, the central processing unit is configured to perform fast Fourier transform on detection points at a same location in all the second spectrums to obtain measured angle data at each detection point.

In this embodiment, the first microprocessor obtains the first spectrum data after performing distance measurement processing on the echo data, and the central processing unit performs speed measurement processing on the first spectrum data to obtain the second spectrum data. Then the central processing unit accumulates all the second spectrums in the second spectrum data, and performs fast Fourier transform on the detection points at the same location in all the second spectrums to obtain the measured angle data at each detection point. In this manner, because distance measurement, speed measurement, and angle measurement are performed on all the detection points to track all the detection points, and then a target that needs to be detected is selected from the tracked detection points, a computing amount is relatively large. However, in this embodiment, a working manner in which the first microprocessor cooperates with the central processing unit can support computing power required in the working manner.

With reference to the fourth possible implementation of the second aspect, in a sixth possible implementation, the central processing unit is configured to perform speed measurement processing and angle measurement processing on the first data to obtain measured speed data and measured angle data of the first radar sensor includes the central processing unit is configured to obtain second spectrum data, where the second spectrum data is spectrum data obtained after distance measurement processing and speed measurement processing are performed on the first spectrum data, the second spectrum data includes at least one second spectrum, and the second spectrum is a spectrum obtained after distance measurement processing and speed measurement processing are performed on the first spectrum, the central processing unit is configured to accumulate all second spectrums in the second spectrum data, where the accumulation may be coherent accumulation or may be incoherent accumulation; the central processing unit is configured to perform a two-dimensional constant false alarm ratio on the second spectrum data obtained after accumulation, to obtain a first target detection point from the detection points, where the first target detection point is some of the detection points, and in all the second spectrums in the second spectrum data, the central processing unit is configured to perform fast Fourier transform on each first target detection point to obtain measured angle data at the first target detection point.

In this embodiment, the central processing unit obtains the second spectrum data after performing speed measurement processing on the first spectrum data, accumulates all the second spectrums in the second spectrum data, and then performs the two-dimensional constant false alarm ratio on the second spectrum data obtained after accumulation to extract some detection points that need to be tracked from the detection points as first target detection points. Then the central processing unit performs fast Fourier transform on each first target detection point to obtain the measured angle data at the first target detection point. In this manner, detection is first performed, and then a point that needs to be tracked is selected by using the two-dimensional constant false alarm ratio and is tracked, so that computing power is relatively reduced.

With reference to the second possible implementation of the second aspect, in a seventh possible implementation, the first radio frequency unit is further configured to send a first chirp signal, where the first chirp signal is used to perform detection. The first radio frequency unit is configured to receive echo data includes: the first radio frequency unit is configured to receive a second chirp signal, where the second chirp signal is a chirp signal returned after the first radio frequency unit sends the first chirp signal.

In this embodiment, the first chirp signal transmitted by the first radio frequency unit bounces after touching an obstacle, so that the first radio frequency unit can receive the second chirp signal to perform detection.

With reference to the seventh possible implementation of the second aspect, in an eighth possible implementation, the first microprocessor is configured to preprocess the echo data to obtain first data includes the first microprocessor is configured to preprocess the second chirp signal to obtain measured distance data. The central processing unit is configured to perform post-processing on the first data to obtain the second data of the first radar sensor includes the central processing unit is configured to when a quantity of accumulated second digital chirp signals corresponding to the measured distance data reaches one frame, perform speed measurement processing and angle measurement processing on the second digital chirp signal.

In this embodiment, each time the first radio frequency unit receives a second digital chirp signal, the first microprocessor performs one time of distance measurement processing on the second digital chirp signal, and then the first microprocessor sends the measured distance data of all the radar sensors to the central processing unit. Because a plurality of groups of measured distance data are required to measure a speed, when the quantity of accumulated second digital chirp signals corresponding to the measured distance data reaches one frame, the central processing unit performs speed measurement processing and angle measurement processing on the second digital chirp signal.

With reference to the seventh possible implementation of the second aspect, in a ninth possible implementation, the first microprocessor is configured to preprocess the echo data to obtain first data includes the first microprocessor is configured to perform downsampling on X second digital chirp signals received by the first radio frequency unit, to obtain Y third digital chirp signals, where both X and Y are positive integers greater than one, and Y is less than X. The central processing unit is configured to perform post-processing on the first data to obtain the second data of the first radar sensor includes the central processing unit is configured to perform distance measurement processing, speed measurement processing, and angle measurement processing on the third digital chirp signal in the first data to obtain measured distance data, measured speed data, and measured angle data.

In this embodiment, when a sampling quantity of the first radio frequency unit is greater than a quantity required by the radar system, the first microprocessor needs to perform downsampling on the second digital chirp signals received by the first radio frequency unit, to compress an amount of data received by the first radio frequency unit, thereby meeting a working requirement of the radar system.

With reference to the second to the ninth possible implementations of the second aspect, in a tenth possible implementation, the first microprocessor is configured to preprocess the echo data to obtain first data includes the first microprocessor is configured to compress the echo data to obtain first compressed data. The central processing unit is configured to perform post-processing on the combined data includes the central processing unit is configured to decompress the compressed combined data.

In this embodiment, after performing distance measurement processing on the echo data, the first microprocessor further compresses the measured distance data, so that the first microprocessor transmits the compressed data to the central processing unit, thereby reducing pressure of data transmission between the first microprocessor and the central processing unit, and improving a data throughput capability.

It can be learned from the foregoing technical solutions that the embodiments of this application have the following advantages:

In this embodiment of the present disclosure, a radar system is provided, which may be applied to an in-vehicle radar in automated driving, such as an in-vehicle millimeter-wave radar. The radar system includes at least one radar sensor, a first radar sensor in the at least one radar sensor includes a data combination module and M radar monolithic chips, each radar monolithic chip includes a first radio frequency unit and a first microprocessor, and M is an integer greater than one. The first radio frequency unit is configured to receive echo data. The first microprocessor is configured to preprocess the echo data to obtain first data. The data combination module is configured to combine the first data respectively output by the M radar monolithic chips, to obtain combined data of the first radar sensor. The data combination module is further configured to transmit the combined data, where the combined data is used to obtain second data of the first radar sensor after undergoing post-processing, and the second data of each of the at least one radar sensor is used to generate point cloud information of the radar system. In this embodiment, through task division between the first microprocessor and the central processing unit, the system can be compatible with a radar sensor with a larger-scale antenna array and can be adaptive to different system parameters and algorithm processing procedures. Both computing power burden of the microprocessor and the central processing unit and hardware resource burden are correspondingly reduced, and resource allocation is more proper. In addition, processing efficiency is improved because the microprocessor and the central processing unit work together.

DESCRIPTION OF EMBODIMENTS

Figure 1:
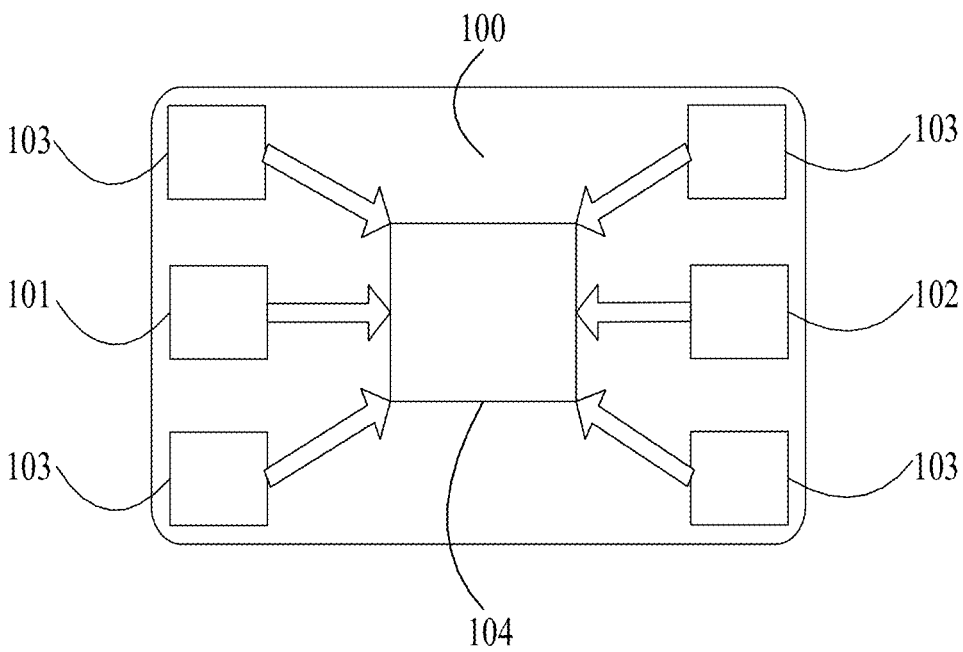
FIG. 1 is a system architectural diagram of a currently used distributed radar-signal processing unit.

Embodiments of the present disclosure provide a radar system, to adjust task division in the radar system by performing multi-level domain processing on radar data, thereby improving a processing capability, a data cache capability, and a data throughput capability of the radar system.

To make a person skilled in the art understand the technical solutions in this application better, the following clearly describes the technical solutions in the embodiments of this application with reference to the accompanying drawings in the embodiments of this application. It is clear that the described embodiments are merely some but not all of the embodiments of this application. All other embodiments obtained by a person of ordinary skill in the art based on the embodiments of this application without creative efforts shall fall within the protection scope of this application.

In the specification, claims, and accompanying drawings of this application, the terms "first", "second", "third", "fourth", and so on (if exists) are intended to distinguish between similar objects but do not necessarily indicate a specific order or sequence. It should be understood that the data termed in such a way are interchangeable in an appropriate circumstance, so that the embodiments described herein can be implemented in another order than the order illustrated or described herein. Moreover, the terms "include", "have" and any other variants mean to cover the non-exclusive inclusion, for example, a process, method, system, product, or device that includes a list of steps or units is not necessarily limited to those units, but may include other units not expressly listed or inherent to such a process, method, system, product, or device.

It should be understood that, in this application, "at least one (item)" means one or more, and "a plurality of" means two or more. The term "and/or" is used to describe an association relationship between associated objects, and indicates that three relationships may exist. For example, "A and/or B" may indicate the following three cases: Only A exists, only B exists, and both A and B exist, where A and B may be singular or plural. The character "/" usually represents an "or" relationship between the associated objects. "At least one of the following" or a similar expression thereof indicates any combination of the following, including any combination of one or more of the following: for example, at least one of a, b, and c may indicate a, b, c, "a and b", "a and c", "b and c", or "a, b, and c", where a, b, and c may be singular or plural.

A high-resolution in-vehicle radar is an indispensable important part in automated driving, and is used to measure a target distance and a target speed. In the field of automated driving, a radar sensor needs to provide a stronger environment awareness capability. Enlarging an array antenna scale of the radar sensor is a typical method for improving a capability of measuring an environment by the sensor. On the basis of speed measurement and distance measurement, more transmit/receive antennas can enhance a capability of distinguishing between target angles by the radar sensor.

Correspondingly, a large-scale antenna array brings a requirement of a stronger data throughput, a storage requirement of more data, and a requirement of larger computing power. Therefore, subsequent signal processing and data processing capabilities also need to match a gradually improved sensor specification. However, a location at which a radar can be installed on a vehicle body and a corresponding installation size do not continuously increase. As an antenna array scale of a radar sensor increases, a quantity of receive antennas greatly increases.

FIG. 1 is a system architectural diagram of a currently used distributed radar-signal processing unit. As shown in FIG. 1, six radars (or a plurality of radars, which is not limited) are disposed around a vehicle body 100, which are respectively a forward radar sensor 101, a backward radar sensor 102, and four angular radar sensors 103. Each radar sensor includes two parts a digital front end (DFE) and a sensor RPU. The DFE includes a transmit/receive antenna and a corresponding radio frequency front-end circuit, and transmits, by using an analog-to-digital converter (ADC), converted digital data to the sensor RPU for processing. The sensor RPU performs millimeter-wave radar signal processing, which usually includes signal processing such as distance measurement, speed measurement, and angle measurement, and may also include high-level data processing such as point cloud data convergence and moving target tracking. After data processing by each radar, result information is transmitted in a form of a digital signal to a central RPU 104 to undergo a subsequent processing task such as multi-radar data convergence.

When an in-vehicle millimeter-wave radar system is constructed by using the architecture in FIG. 1, as an antenna array scale of the radar sensor gradually increases, an amount of obtained data and a data transmission bandwidth gradually increase, and due to limitation of a volume, a weight, and power consumption, each radar sensor quickly enters a bottleneck of a processing capability, a cache capability, and a data throughput capability. Consequently, it is difficult for the radar system to adapt to a processing requirement of a radar sensor with a larger-scale-antenna array, and it is also difficult for the radar system to be compatible with more flexible system parameter design.

Figure 2:
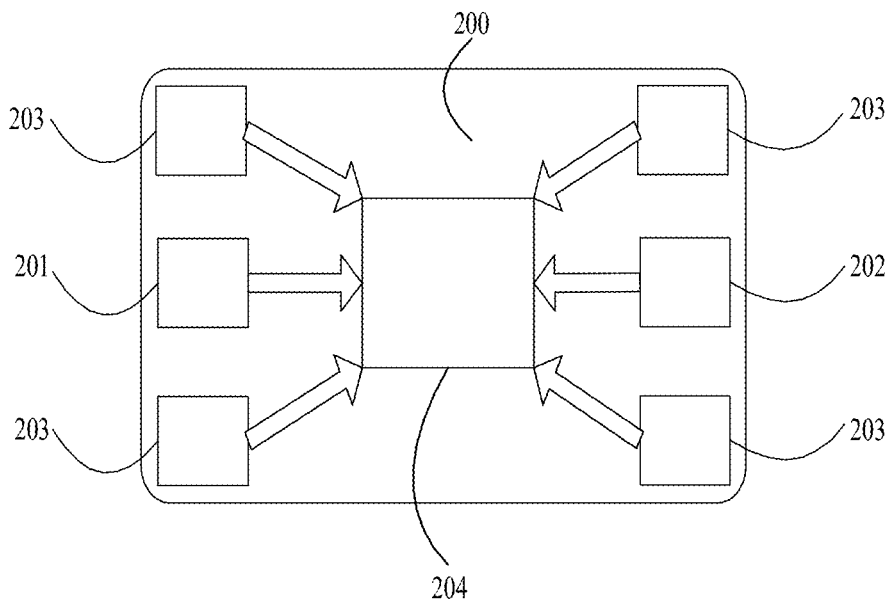
FIG. 2 shows a system architecture of a currently used single central radar-signal processing unit.

FIG. 2 shows a system architecture of a currently used single central RPU. As shown in FIG. 2, six radars (or a plurality of radars, which is not limited) are disposed around a vehicle body 200, which are respectively a forward radar sensor 201, a backward radar sensor 202, and four angular radar sensors 203. Each radar sensor includes only an analog front end (AFE), and a transmit/receive antenna and a radio frequency front-end circuit are inside the AFE. After processing such as amplification, filtering, and down-mixing are performed by the radio frequency front-end analog circuit on a signal obtained by the receive antenna, an analog signal is transmitted to a central RPU 204. Corresponding to a plurality of analog signal channels of the radars, a plurality of ADCs are disposed inside the central RPU 204. After the analog signal is converted by the ADC, radar digital signal processing and high-level data convergence processing are performed inside the central RPU 204.

When an in-vehicle millimeter-wave radar system is constructed by using the architecture in FIG. 2, as an antenna array scale of the radar sensor increases, a quantity of receive antennas greatly increases, which causes a great increase in a quantity of channels of the analog signal output by each radar sensor. Correspondingly, dozens or even hundreds of analog signal receiving ports and corresponding ADCs need to be configured at one end of the central RPU

204, which causes a great increase in a chip area and a size of a corresponding processing board that are of the central RPU 204. In addition, because both a signal processing task and a data convergence task are undertaken by the central RPU 204, a great challenge is brought to computing power of the processor. These disadvantages also restrict adaptability of the system to a radar sensor with a large-scale antenna array.

Therefore, if data of a plurality of radar sensors is uniformly processed by using a central processing unit, a great challenge is brought to computing power of the central processing unit. If the data is processed by using a processor at one end of the radar sensor and is then sent to the central processing unit for convergence, the processor at the end of the radar sensor quickly enters a bottleneck of a processing capability, a cache capability, and a data throughput capability. These disadvantages restrict adaptability of a radar system to a radar sensor with a large-scale antenna array.

To resolve the foregoing problem, the embodiments of this application provide a radar system, to adjust task division in the radar system by performing multi-level domain processing on radar data, thereby improving a processing capability, a data cache capability, and a data throughput capability of the radar system.

It should be noted that the radar system provided in this application is not limited to a use scenario of an in-vehicle radar, and may also be used in another radar system and another electronic processing system similar to a topology structure, so that the system is compatible with a plurality of peripheral configurations by using flexible configuration of a processing task and a processing mode. A standardized and miniaturized distributed processing unit cooperates with a powerful central processing unit to implement software upgrade of the system.

For ease of understanding, the radar system provided in the embodiments of this application is described below in detail with reference to the accompanying drawings.

The radar system provided in this application includes at least one radar sensor, a first radar sensor in the at least one radar sensor includes a data combination module and M radar monolithic chips, each radar monolithic chip includes a first radio frequency unit and a first microprocessor, and M is an integer greater than one.

The first radio frequency unit is configured to receive echo data.

The first microprocessor is configured to preprocess the echo data to obtain first data.

The data combination module is configured to combine the first data respectively output by the M radar monolithic chips, to obtain combined data of the first radar sensor.

The data combination module is further configured to transmit the combined data, where the combined data is used to obtain second data of the first radar sensor after undergoing post-processing, and the second data of each of the at least one radar sensor is used to generate point cloud information of the radar system.

In this embodiment, data transmitted by the data combination module may be sent to a central processing unit. In the following embodiment, a next-level processor is a central processing unit is used as an example for description. However, this is not limited in this embodiment of this application. When the radar system further includes a central processing unit, the data combination module is further configured to transmit the combined data includes the data combination module is configured to transmit the combined data to the central processing unit. The central processing unit is configured to perform post-processing on the combined data to obtain the second data of the first radar sensor.

It should be noted that specific implementations in which the data combination module combines data may be classified into two manners based on a transmission bit width between the data combination module and a next-level processor (for example, the central processing unit) data packing and conversion from parallel to serial, which are separately described below.

1. Data Packing

If a signal transmission bit width between the data combination module and a next-level processor (for example, the central processing unit) is greater than or equal to a bit width of the combined data of the first radar sensor, the data combination module is configured to combine the first data respectively output by the M radar monolithic chips includes the data combination module is configured to package the first data respectively output by the M radar monolithic chips.

In this embodiment, the signal transmission bit width between the data combination module and the central processing unit is greater than or equal to the bit width of the combined data of the first radar sensor, that is, a transmission channel between the data combination module and the central processing unit can completely transmit the combined data of the first radar sensor. Therefore, the data combination module can send the obtained combined data to the central processing unit simply by packaging the first data respectively output by the M radar monolithic chips.

2. Conversion from Parallel to Serial

If a signal transmission bit width between the data combination module and a next-level processor (for example, the central processing unit) is less than a bit width of the combined data of the first radar sensor, the data combination module is configured to combine the first data respectively output by the M radar monolithic chips includes the data combination module is configured to convert the first data respectively output by the M radar monolithic chips from parallel data into serial data, and the data combination module is configured to cache the serial data. The data combination module is configured to transmit the combined data to the central processing unit includes the data combination module is configured to transmit the serial data to the central processing unit N times, where N is an integer greater than one.

In this embodiment, when the signal transmission bit width between the data combination module and the central processing unit is less than the bit width of the combined data of the first radar sensor, the data combination module cannot transmit the combined data to the central processing unit through a transmission channel at one time. Therefore, the data combination module needs to convert the combined data from the parallel data into the serial data and cache the serial data, and then transmits the serial data to the central processing unit several times, so that when the transmission bit width is less than the bit width of the combined data, the data combination module can transmit complete combined data to the central processing unit.

Figure 3:
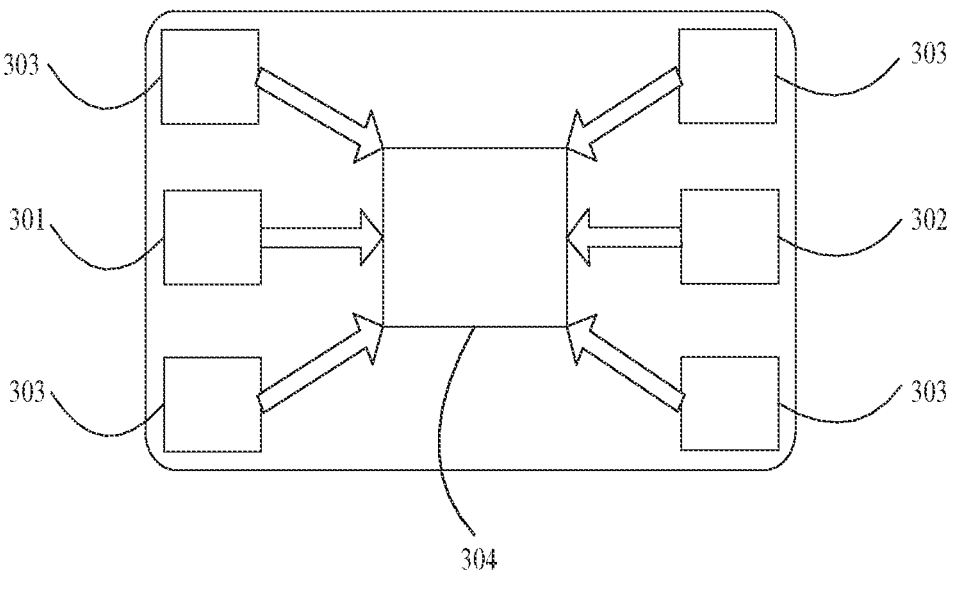
FIG. 3 is a system architectural diagram of a radar system according to an embodiment of the present disclosure.
Figure 4:
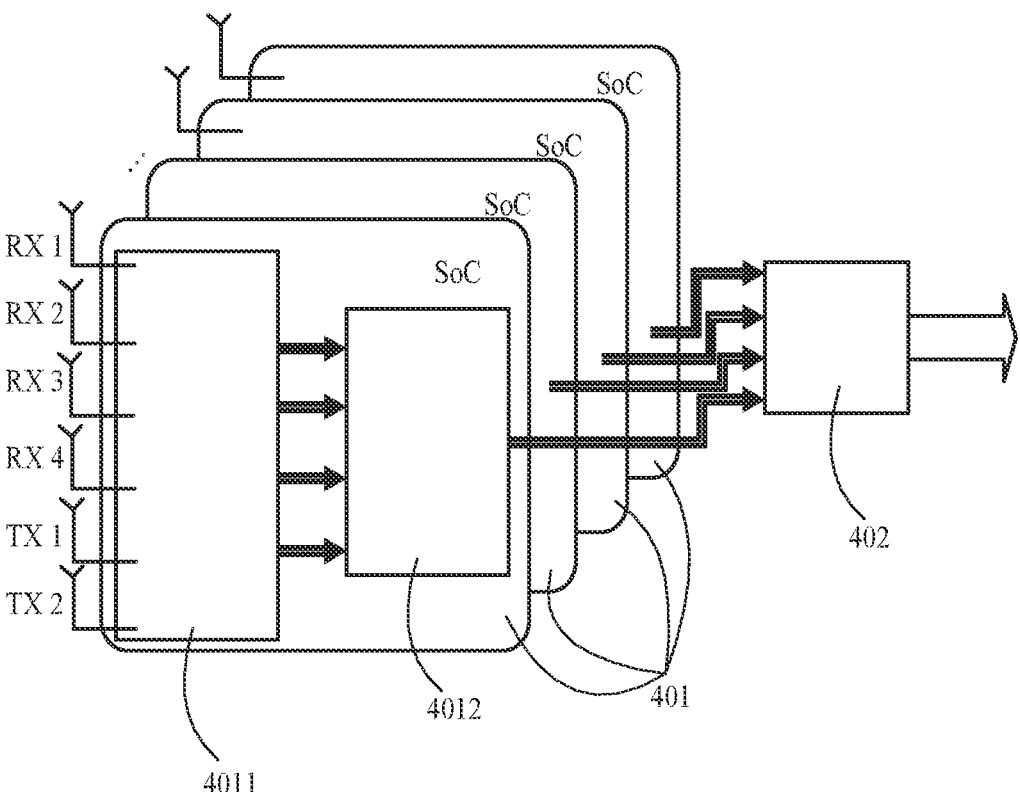
FIG. 4 is a schematic diagram of an implementation of a radar sensor in a radar system according to an embodiment of the present disclosure.

It should be noted that a structure of the radar system may be shown in FIG. 3. The radar system includes a central processing unit 304 and a total of six radar sensors: a forward radar sensor 301, a backward radar sensor 302, and four angular radar sensors 303. The radar sensors have a same structure. Each radar sensor is a cascaded radar sensor, and includes M radar monolithic chips and a data combination module. Optionally, there may be one or more data combination module in each radar sensor. This is not limited in this embodiment of this application. Optionally, the radar monolithic chip may be implemented by a SoC, and each radar monolithic chip includes a radio frequency unit and a microprocessor. Quantities of radio frequency units and microprocessors on each radar monolithic chip are not limited in this application. Further, the radio frequency unit may include a transmit/receive antenna, for example, a multiple-transmit multiple-receive transmit/receive antenna. As shown in FIG. 4, for example, a radar sensor in FIG. 4 is a radar sensor formed by cascading four SoC radar monolithic chips 401. A radio frequency (RF) front end 4011 and a microprocessor 4012 are disposed on each SoC radar monolithic chip 401. The RF front end 4011 provides four receive antennas RX 1 to RX 4 and two transmit antennas TX 1 and TX 2. Each SoC radar monolithic chip 401 forms a 2-transmit 4-receive structure. The four SoC radar monolithic chips 401 are cascaded together to form an 8-transmit 16-receive radar antenna array. The microprocessors 4012 on the four SoC radar monolithic chips 401 are connected to a same data combination module 402. The data combination module 402 sends combined data to a central processing unit by using Ethernet. Optionally, each RF front end 4011 may further include RF circuits such as a power amplifier (PA), a low noise amplifier (LNA), a mixer, and an intermediate filter, and a chirp signal parameter configuration register.

In this embodiment, a cascaded sensor formed by cascading a plurality of radars has a relatively large amount of data, which causes a relatively large challenge to a data throughput and computing power of a processor in a solution in a conventional technology. To resolve this problem, in the solution provided in this embodiment, the microprocessor is disposed on each radar monolithic chip in the cascaded radar sensor. The microprocessor preprocesses echo data obtained by the radio frequency unit, and then the data combination module combines data preprocessed by the monolithic chips in the radar sensor, to obtain combined data. Next, the central processing unit performs post-processing on the combined data, so that the microprocessor and the central processing unit share computing power. Through multi-level domain data processing, computing power burden caused to the microprocessor or the central processing unit due to an increase in a quantity of cascaded radars is avoided. Therefore, a bottleneck problem of a processing capability, a cache capability, and a data throughput capability of a radar sensor with a large-scale antenna array is resolved. The central processing unit may be a multi domain controller (MDC) that has relatively strong computing power and that is rich in interfaces.

It should be noted that post-processing performed by the central processing unit is not converging data processed by the radar sensors, but further processing the data preprocessed by the first radar sensor, to obtain the second data of the first radar sensor. Detailed procedures of preprocessing and post-processing are described below.

1. The first microprocessor is configured to preprocess the echo data to obtain first data includes the first microprocessor is configured to perform distance measurement processing on the echo data to obtain measured distance data.

Optionally, the distance measurement processing further includes the first microprocessor performs zero padding on the echo data, the first microprocessor performs windowing processing on the echo data obtained after zero padding, and the first microprocessor performs fast Fourier transform on the windowed echo data to obtain first spectrum data, where the first spectrum data includes at least one first spectrum.

In this embodiment, the first radio frequency unit may be in a multiple-transmit multiple-receive structure, and includes a plurality of receive antennas. Therefore, echo data received by all the receive antennas forms a first spectrum.

Further, the first spectrum may be represented by a matrix. The matrix includes horizontal rows and vertical columns. Each row records different detection points detected by one piece of echo data, and each column records a same detection point detected by different echo data. Each single frequency corresponds to a detection point detected by one piece of echo data, so that measured distance data at each detection point can be obtained. The detection point is a point in the point cloud information.

Further, the data combination module is configured to combine the first data respectively output by the M radar monolithic chips, to obtain combined data of the first radar sensor includes the data combination module is configured to combine the measured distance data respectively output by the M radar monolithic chips to obtain the combined data of the first radar sensor.

2. The central processing unit performs post-processing on the combined data to obtain the second data of the first radar sensor includes the central processing unit performs speed measurement processing and angle measurement processing on the combined data to obtain measured speed data and measured angle data of the first radar sensor.

Optionally, in a process of speed measurement processing includes the central processing unit obtains speed data at each detection point based on the distance data corresponding to each single frequency in the first spectrum data.

In this embodiment, each single frequency in the first spectrum data corresponds to measured distance data, that is, the distance data, corresponding to a detection point. Therefore, when performing a speed measurement operation, the central processing unit performs fast Fourier transform on each column to obtain measured speed data, because each column in the matrix of the first spectrum represents data that is at a same detection point and that corresponds to different echo data. In this case, a second spectrum is obtained, and the second spectrum records measured distance data and measured speed data at each detection point.

Angle measurement processing may be divided into two working manners: tracking before detection (TBD) and tracking after detection (TAD). Descriptions are separately provided below.

1. TBD

The central processing unit obtains second spectrum data, where the second spectrum data is spectrum data obtained after distance measurement processing and speed measurement processing are performed on the first spectrum data, the second spectrum data includes at least one second spectrum, and the second spectrum is a spectrum obtained after distance measurement processing and speed measurement processing are performed on the first spectrum.

The central processing unit accumulates all second spectrums in the second spectrum data, where the accumulation may be coherent accumulation or may be incoherent accumulation.

In all the second spectrums in the second spectrum data, the central processing unit performs fast Fourier transform on detection points at a same location to obtain measured angle data at each detection point.

In this embodiment, the central processing unit performs angle measurement on each point, so that distance, speed, and angle data at the point can be obtained. Then the central processing unit selects a point whose distance, speed, and angle change stably as a detection point and continuously detects the point, to implement working of the radar system. In this embodiment of this application, the combined data received by the central processing unit undergoes distance measurement processing performed by the microprocessor. Therefore, computing power of the central processing unit can be first detected to obtain a distance and speed change trend at each detection point, so that a detection point whose speed and distance linearly change is obtained from all detection points as a first target detection point, and then the first target detection point is tracked. Therefore, it can be ensured that most sufficient point cloud information is obtained to improve precision of radar detection.

2. TAD

The central processing unit obtains second spectrum data.

The central processing unit accumulates all second spectrums in the second spectrum data, where the accumulation may be coherent accumulation or may be incoherent accumulation.

The central processing unit performs a two-dimensional constant false alarm ratio on the second spectrum data obtained after accumulation, to obtain a first target detection point from the detection points, where the first target detection point are some of the detection points.

In all the second spectrums in the second spectrum data, the central processing unit performs fast Fourier transform on each first target detection point to obtain measured angle data at the first target detection point.

In this embodiment, the central processing unit performs coherent accumulation or incoherent accumulation on the first spectrum data in the combined data to perform the two-dimensional constant false alarm ratio (CFAR), obtains the first target detection point by interpreting the two-dimensional CFAR, and then performs angular fast Fourier transform on each first target detection point in the second spectrum data to obtain angle data at the first target detection point. In this embodiment, the first target detection point is first detected by using the two-dimensional CFAR, and then the first target detection point is tracked, so as to reduce computing power of the central processing unit.

During actual working, this embodiment of this application can support the two working manners TAD or TBD. A person skilled in the art may select a working manner based on a requirement. This is not limited in this embodiment of this application.

It should be noted that the echo data may be implemented by a chirp signal. A specific working manner of the chirp signal in the radar system provided in this embodiment of this application is described below in detail.

Before the first radio frequency unit receives the echo data, the method further includes: the first radio frequency unit sends a first chirp signal.

In this embodiment, the first chirp signal is a signal used to perform detection.

In this case, the first radio frequency unit receives the echo data, the first radio frequency unit is configured to receive a second chirp signal.

In this embodiment, the second chirp signal is a signal bounced by an echo after the first chirp signal detects a detected object after the first radio frequency unit sends the first chirp signal.

In this case, the processing the echo data in the foregoing step is further processing the second chirp signal. Each time each of the M radar monolithic chips outputs measured distance data of a second digital chirp signal, the measured distance data respectively output by the M radar monolithic chips is combined to obtain the combined data of the first radar sensor. When a quantity of accumulated second digital chirp signals corresponding to the measured distance data reaches one frame, speed measurement processing and angle measurement processing are performed on the second digital chirp signal.

It should be noted that several second digital chirp signals form one frame of second digital chirp signal. A specific quantity of second digital chirp signals included in one frame depends on resolution of the radar system. Higher resolution of the radar system indicates a larger quantity of second digital chirp signals included in one frame. A person skilled in the art may set, based on an actual working requirement, a quantity of second digital chirp signals corresponding to one frame of second digital chirp signal. For example, duration of the chirp signal is 15 microsecond (μs). To measure a speed, 64 chirp signals are accumulated per frame, and a size of original echo data is approximately 8 M bytes. The central processing unit cannot determine a speed at a detection point by using only one group of measured distance data. Therefore, the central processing unit needs to start speed measurement processing and angle measurement processing only when a quantity of received second chirp signal reaches one frame.

A specific manner of processing a chirp signal by a radar system is described below in detail by using an example.

A radio frequency unit in the radar system sends a first chirp signal by using a transmit antenna, and then receives, by using a receive antenna, a second chirp signal obtained after the first chirp signal echoes. Assuming that one transmit antenna sends 64 first chirp signals in one frame, and each chirp signal detects 1024 detection points, the receive antenna also receives 64 chirp signals in one frame, and each chirp signal detects 1024 detection points. A first spectrum is obtained after the chirp signals received by the receive antenna are summarized. The first spectrum may be represented as a first two-dimensional matrix shown in the following Matrix 1:

$$
\begin{bmatrix}
S_{1,1} & S_{1,2} & \dots & S_{1,1024} \\
S_{2,1} & S_{2,2} & \dots & S_{2,1024} \\
\vdots & \ddots & & \\
S_{64,1} & S_{64,2} & \dots & S_{64,1024}
\end{bmatrix} \qquad \text{Matrix 1}
$$

As shown in Matrix 1, in the second chirp signals, each detection point of each chirp signal forms a sample (S). In Matrix 1, $S_{1,1}$ represents a first detection point of a first chirp signal, and $S_{1,1024}$ represents a $1024^{th}$ detection point of the first chirp signal. By analogy, $S_{64,1024}$ represents a $1024^{th}$ detection point of a $64^{th}$ chirp signal.

Based on Matrix 1, a specific processing procedure of the radar system provided in this embodiment of this application is as follows.

1. Distance Measurement Processing

In this embodiment, the process in which the first microprocessor preprocesses the echo data to obtain the first data includes:

In a process of obtaining the echo data by the first microprocessor, each time obtaining a second chirp signal, for example, the first chirp signal S1 in the second chirp signals, the first microprocessor can obtain one row of the matrix in Matrix 1. The first microprocessor performs fast Fourier transform on S1 in real time to obtain the measured distance data $S_{1,1}$ to $S_{1,1024}$, to complete distance measurement processing on the first chirp signal in the second chirp signals, so as to obtain the first row of measured distance data in Matrix 1. Then the first row of measured distance data is sent to the central processing unit after being combined by the data combination module.

2. Speed Measurement Processing

The central processing unit performs speed measurement processing on the combined data to obtain measured speed data of the first radar sensor includes when a quantity of accumulated second chirp signals received by the central processing unit reaches one frame, the central processing unit obtains data in all rows of the first two-dimensional matrix shown in the Matrix 1. The central processing unit performs fast Fourier transform on a detection point in each column of the first two-dimensional matrix to obtain speed information at each detection point, so as to complete speed measurement processing. For example, the central processing unit performs fast Fourier transform on the row including $S_{1,1}$ to $S_{64,1}$ to obtain $RD_{1,1}$ to $RD_{64,1}$, so as to obtain a second spectrum. The second spectrum may be represented as the following second two-dimensional matrix:

$$\begin{bmatrix} RD_{1,1} & RD_{1,2} & \dots & RD_{1,1024} \\ RD_{2,1} & RD_{2,2} & \dots & RD_{2,1024} \\ \vdots & \ddots & & \\ RD_{64,1} & RD_{64,2} & \dots & RD_{64,1024} \end{bmatrix} \qquad \text{Matrix 2}$$

As shown in Matrix 2, in the second two-dimensional matrix, two times of fast Fourier transform are performed on each detection point S to obtain a detection point RD. Each detection point RD is a single frequency, and each single frequency records measured distance data and measured speed data at the detection point. For example, $RD_{1,1}$ indicates that a distance and a speed at the detection point are respectively 3 m and 2 m/s; $RD_{1,2}$ indicates that a distance and a speed at the detection point are respectively 4 m and 5 m/s; and $RD_{1,1024}$ indicates that a distance and a speed at the detection point are respectively 1024 m and 5 m/s.

3. Angle Measurement Processing

Figure 11:
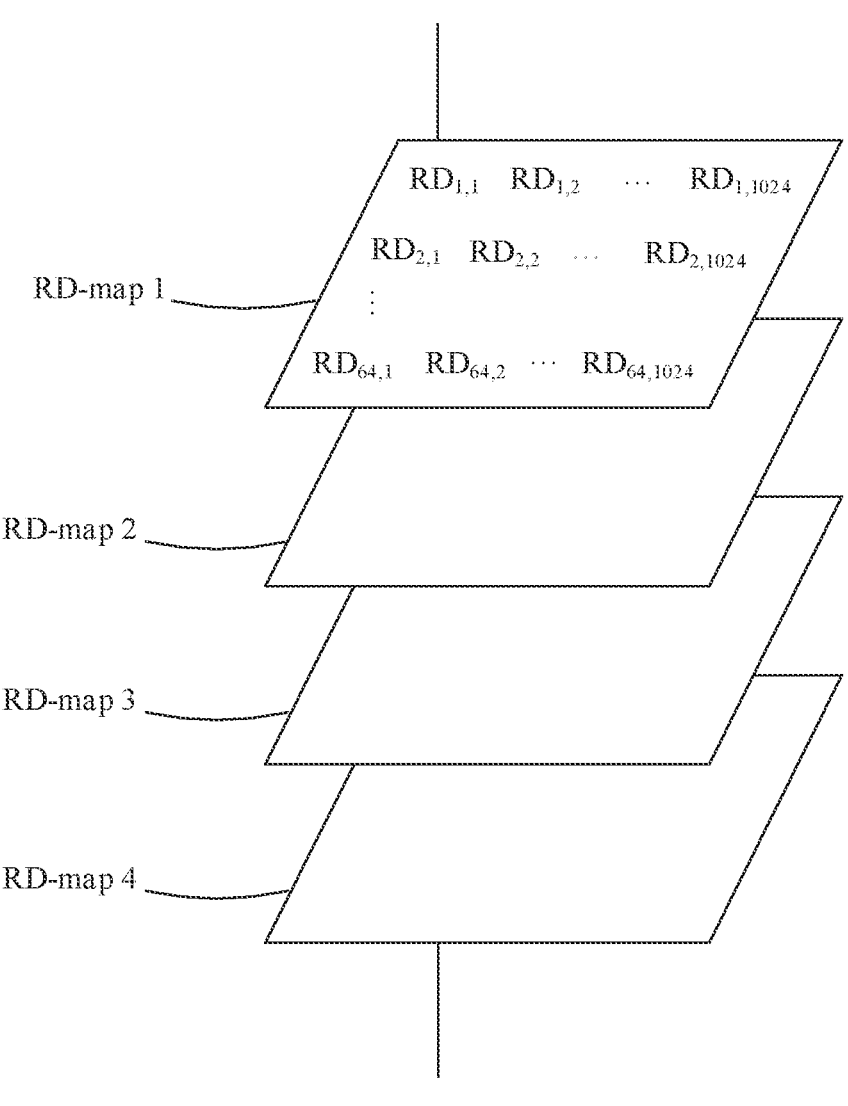
FIG. 11 is a schematic diagram of angle measurement processing performed on a second spectrum when a radar system processes data according to an embodiment of the present disclosure.

Referring to FIG. 11, in the radar system provided in this embodiment of this application, the radio frequency unit may be in a multiple-transmit multiple-receive structure, and includes a plurality of receive antennas. Therefore, echo data received by each receive antenna forms a first spectrum, and a plurality of second spectrums are correspondingly obtained after the foregoing speed measurement processing is performed on the first spectrums. As shown in FIG. 11, a 2-transmit 4-receive radio frequency unit is used as an example. Because the 2-transmit 4-receive radio frequency unit has four receive antennas, each second chirp signal is received by the four receive antennas, and four second spectrums RD-map 1 to RD-map 4 are correspondingly generated.

As described above, angle measurement processing on the second spectrum data may be divided into two working manners: TAD or TBD, which are further described below.

(1) TBD

The central processing unit accumulates all the four second spectrums to obtain second spectrum data shown in FIG. 11.

In all the second spectrums in the second spectrum data, the central processing unit performs fast Fourier transform on detection points at a same location to obtain measured angle data at each detection point.

In this embodiment, as shown in FIG. 11, using $RD_{1,1}$ as an example, the detection point $RD_{1,1}$ on each second spectrum RD-map records distance information and speed information at a first detection point of a first chirp signal in the second chirp signals. Because four receive antennas generate four RD-maps, each RD-map includes one detection point $RD_{1,1}$. Fast Fourier transform is performed on four detection points $RD_{1,1}$ respectively corresponding to the four RD-maps, to obtain angle information at the detection points $RD_{1,1}$, thereby finally obtaining a distance, a speed, and an angle at the first detection point. Similarly, same processing is performed on each detection point on the RD-map to obtain distances, speeds, and angles at all the detection points. Finally, the central processing unit selects a detection point whose distance, speed, and angle change stably from the detection points and continuously tracks the detection point, to implement working of the radar system.

(2) TAD

The central processing unit performs a CFAR on all second spectrums in second spectrum data to obtain a first target detection point. The first target detection point is a detection point whose distance and speed change stably.

In this embodiment, because the second spectrum data records distance information and speed information at each detection point, a detection point whose distance and speed change stably can be obtained simply by performing two-dimensional CFAR processing on all the second spectrums in the second spectrum data. In the radar system, only the detection point whose distance and speed change stably is worth detecting. Therefore, a point that does not need to be detected can be filtered out in advance in this manner.

The central processing unit accumulates all the second spectrums in the second spectrum data.

In this embodiment, the accumulation may be coherent accumulation or incoherent accumulation. After accumulation, second spectrum data shown in FIG. 11 is obtained.

In all the second spectrums in the second spectrum data, the central processing unit performs fast Fourier transform on each first target detection point to obtain measured angle data at the first target detection point.

In this embodiment, still as shown in FIG. 11, it should be noted that although in both of the two working manners TBD and TAD, the second spectrum data for angle measurement processing by the central processing unit can be represented by using FIG. 11, there is a difference between the two manners. In the working manner TBD, each RD-map in the RD-map 1 to the RD-map 4 includes information about all the detection points. However, in the working manner TAD, each RD-map in the RD-map 1 to the RD-map 4 includes information about the first target detection point.

Further, in the working manner TAD, it is assumed that $RD_{1,1}$ is the first target detection point, and the detection point $RD_{1,1}$ on each second spectrum RD-map records the distance information and the speed information at the first detection point of the first chirp signal in the second chirp signals. Because four receive antennas generate four RD-maps, each RD-map includes one detection point $RD_{1,1}$. Fast Fourier transform is performed on four detection points $RD_{1,1}$ respectively corresponding to the four RD-maps, to obtain angle information at the detection points $RD_{1,1}$, thereby finally obtaining a distance, a speed, and an angle at the first target detection point. Similarly, same processing is performed on each first target detection point on the RD-map to obtain distances, speeds, and angles at all the first target detection points, to implement working of the radar system.

It should be noted that to further improve a data throughput capability between the microprocessor and the central processing unit, the microprocessor compresses preprocessed data, and the central processing unit decompresses the received combined data, so that an amount of transmitted data can be reduced, and a data throughput capability can be improved. For ease of understanding, a specific procedure of compression and decompression is described below in detail.

The first microprocessor preprocesses the echo data to obtain the first data includes: the first microprocessor compresses the echo data to obtain first compressed data.

In this embodiment, the first microprocessor compresses the echo data only after completing processing on the echo data. The first microprocessor may process the echo data in any one of the foregoing processing manners. For understanding, refer to the foregoing description. Details are not described herein again.

The data combination module is configured to combine the first data respectively output by the M radar monolithic chips to obtain combined data of the first radar sensor includes the data combination module is configured to combine the first compressed data respectively output by the M radar monolithic chips to obtain compressed combined data of the first radar sensor.

In this embodiment, the data combination module combines the compressed data to obtain the compressed combined data.

The central processing unit is configured to perform post-processing on the combined data includes the central processing unit is configured to decompress the compressed combined data.

In this embodiment, after receiving the compressed combined data, the central processing unit decompresses the compressed combined data to perform a subsequent step.

It should be noted that a technical solution used in the compression and decompression steps may be any compression and decompression solution. For example, a data compression algorithm may rely on result information of range dimension fast Fourier transform or time domain information of original echo data, so as to implement lossy compression or lossless compression. This is not limited in this embodiment of this application.

Further, before starting to process the echo data, the first microprocessor may further perform downsampling on the echo data to further compress an amount of data that needs to be processed. A specific amount of downsampled data may be determined based on an actual use requirement. A working manner of downsampling is described below in detail by using an example in which the echo data is a second digital chirp signal.

The first microprocessor preprocesses the echo data to obtain the first data includes the first microprocessor performs downsampling on X second digital chirp signals received by the first radio frequency unit, to obtain Y third digital chirp signals, where both X and Y are positive integers greater than one, and Y is less than X.

In this embodiment, the first microprocessor samples only some of the second digital chirp signals received by the first radio frequency unit, thereby reducing an amount of data that needs to be processed.

The data combination module is configured to combine the first data respectively output by the M radar monolithic chips, to obtain combined data of the first radar sensor includes the data combination module is configured to combine the third digital chirp signals respectively output by the M radar monolithic chips to obtain the combined data of the first radar sensor.

In this embodiment, the third digital chirp signals respectively output by the M radar monolithic chips are preprocessed third digital chirp signals.

The central processing unit is configured to perform post-processing on the combined data to obtain the second data of the first radar sensor includes the central processing unit is configured to perform post-processing on the third digital chirp signal in the combined data to obtain the second data of the first radar sensor.

It should be noted that when including a technical solution for downsampling, a working procedure of the radar system may include the following four processing manners. Detailed descriptions are provided below.

1. The microprocessor performs downsampling and measures a distance. The data combination module combines data, and the central processing unit measures a speed and an angle.

In this embodiment, the microprocessor performs downsampling on a chirp signal received by the radio frequency unit, and then the microprocessor performs a distance measurement operation on downsampled data. After the data combination unit combines the downsampled data and sends combined data, the central processing unit performs a speed measurement operation and an angle measurement operation on the combined data. For a specific implementation of the downsampling, distance measurement, speed measurement, and angle measurement operations, refer to the foregoing description. Details are not described herein again.

2. The microprocessor performs downsampling—the microprocessor measures a distance—the microprocessor compresses data—the data combination module combines data—the central processing unit performs decompression, measures a speed, and measures an angle.

In this embodiment, the microprocessor performs downsampling on a chirp signal received by the radio frequency unit, and then the microprocessor performs distance measurement processing on downsampled data. Then the microprocessor compresses data obtained after distance measurement processing is performed. After the data combination unit combines compressed data and sends combined data, the central processing unit performs decompression, speed measurement, and angle measurement operations on the combined data. For a specific implementation of the downsampling, distance measurement, speed measurement, and angle measurement operations, refer to the foregoing description. Details are not described herein again.

3. The microprocessor performs downsampling—the data combination module combines data—the central processing unit measures a distance, measures a speed, and measures an angle.

In this embodiment, the microprocessor only performs downsampling on a chirp signal, and then sends, by using the data combination module, downsampled data to the central processing unit for distance measurement, speed measurement, and angle measurement processing. The chirp signal undergoes the downsampling step and a data amount decreases. Therefore, a problem of a data throughput bottleneck can also be resolved. For a specific implementation of the downsampling, distance measurement, speed measurement, and angle measurement processing, refer to the foregoing description. Details are not described herein again.

4. The microprocessor performs downsampling—the microprocessor compresses data—the data combination module combines data—the central processing unit performs decompression, measures a distance, measures a speed, and measures an angle.

In this embodiment, the microprocessor only performs downsampling on a chirp signal, compresses downsampled data, and then sends, by using the data combination module, compressed data to the central processing unit for decompression, distance measurement, speed measurement, and angle measurement processing. The chirp signal undergoes the downsampling step and a data amount decreases. In addition, the downsampled data is compressed. Therefore, a problem of a data throughput bottleneck is further resolved. For a specific implementation of the downsampling, distance measurement, speed measurement, and angle measurement processing, refer to the foregoing description. Details are not described herein again.

An embodiment of this application further provides another radar system. A difference between the radar system and the foregoing radar system lies in a radar sensor. Each radar sensor includes a microprocessor and at least one radio frequency unit. The radar sensor may be specifically implemented in the following two manners.

1. Radar Sensor Formed by Cascading a Plurality of Small-Scale Radars at a Front End.

Figure 5:
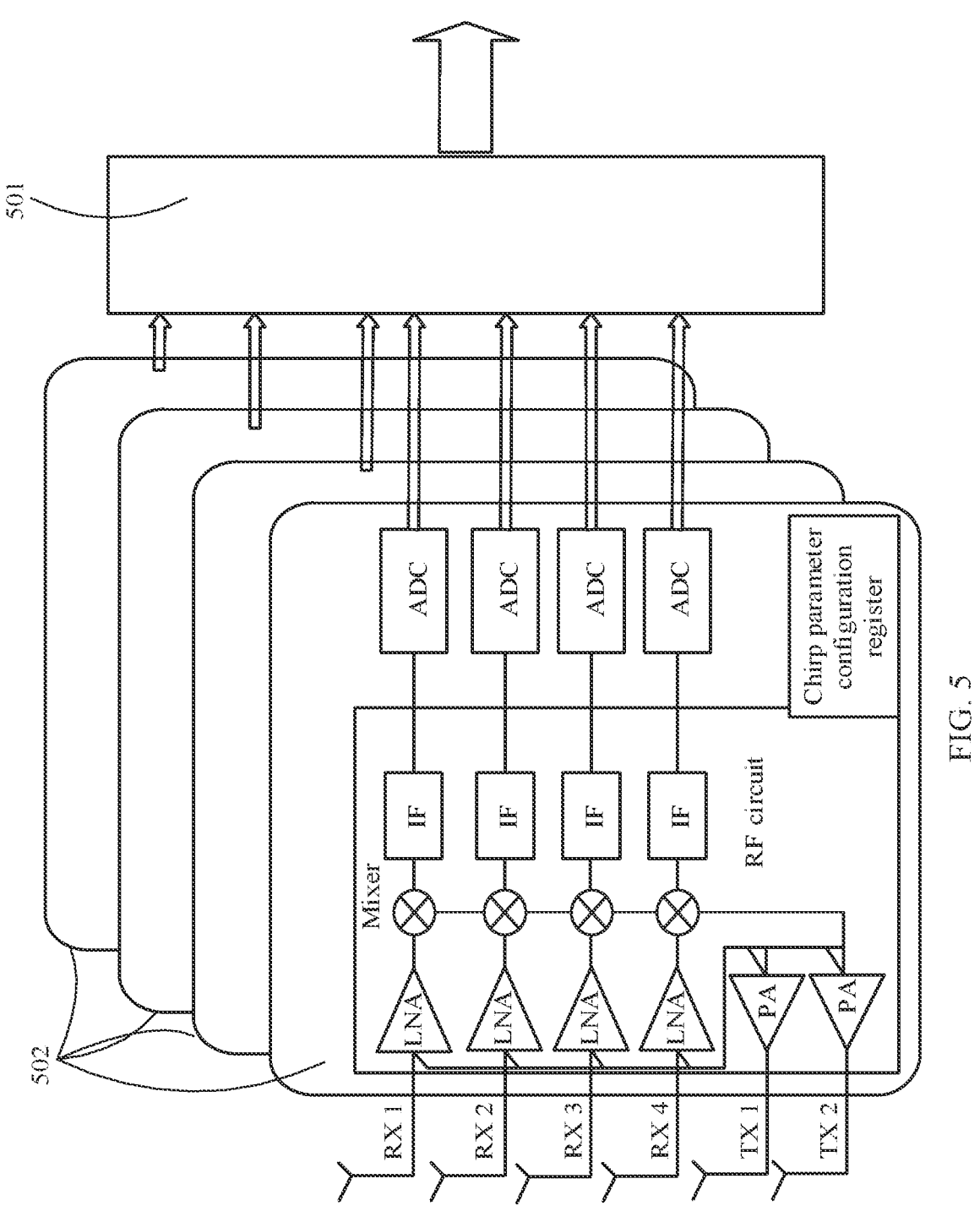
FIG. 5 is a schematic diagram of another implementation of a radar sensor in a radar system according to an embodiment of the present disclosure.

As shown in FIG. 5, the radar sensor includes one microprocessor 501 and four radar monolithic chips 502. The four radar monolithic chips 502 all are connected to a same microprocessor 501, and the microprocessor 501 processes echo data obtained by the four radar monolithic chips 502. Optionally, the radar sensor may be at least one radar monolithic chip 502 and one microprocessor group. The microprocessor group includes at least one microprocessor 501, and the microprocessor group is configured to process echo data of the at least one radar monolithic chip 502. Further, the radar monolithic chip 502 includes a radio frequency unit, RF circuits such as a power amplifier (PA), a low noise amplifier (LNA), a mixer, and an intermediate frequency filter IF, and a chirp signal parameter configuration register. The radio frequency unit may include a transmit/receive antenna, for example, may include four receive antennas RX 1 to RX 4 and two transmit antennas TX 1 and TX 2. Each radar monolithic chip 502 forms a 2-transmit 4-receive structure, and four radar monolithic chips 502 are cascaded together to form an 8-transmit 16-receive radar antenna array. The RX 1 to the RX 4 each are connected to one LNA, and the LNAs each are sequentially connected to an IF and an ADC by using respective mixers. Finally, ADCs of the radar monolithic chips 502 are connected to a same microprocessor 501.

Figure 6:
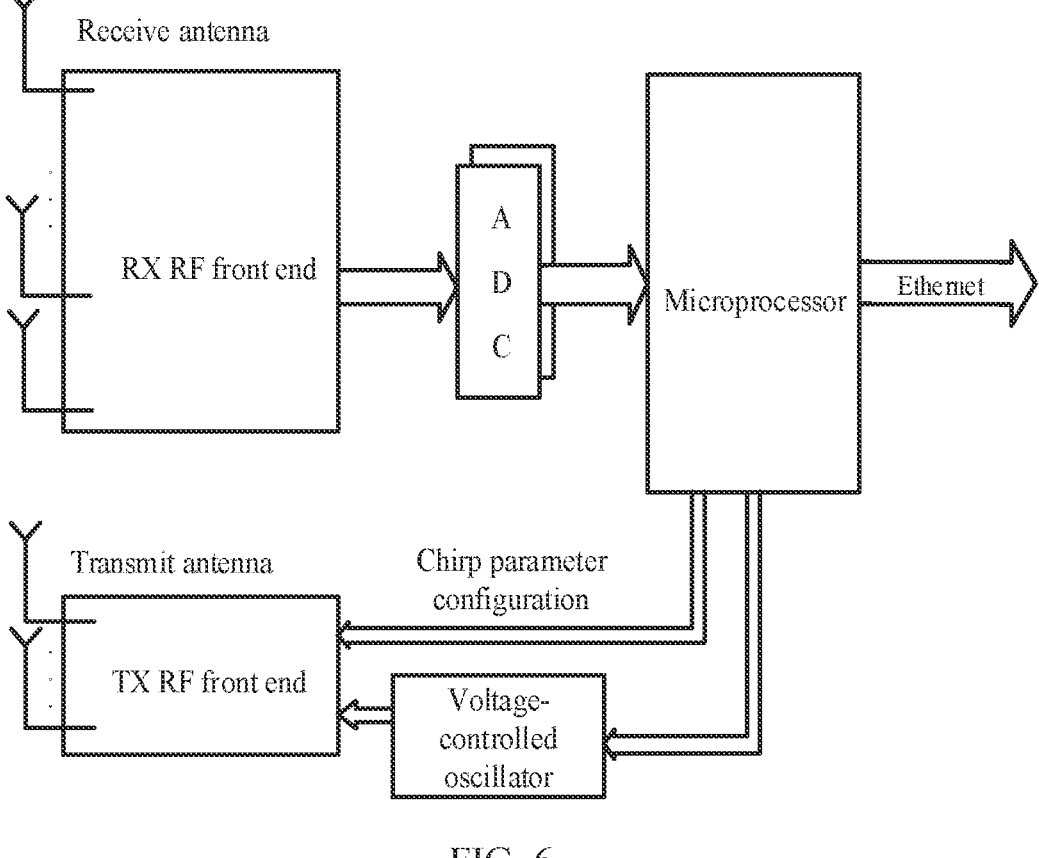
FIG. 6 is a schematic diagram of another implementation of a radar sensor in a radar system according to an embodiment of the present disclosure.

2. Radar Sensor in which a Transmit End and a Receive End are Separately Disposed As shown in FIG. 6, the radar sensor includes a microprocessor and a radio frequency unit connected to the microprocessor. The radio frequency unit includes a receive-end radio frequency front end (RX RF front end) and a transmit-end radio frequency front end (TX RF front end) that are separately disposed. The RX RF front end is connected to the microprocessor by using an ADC, and sends echo data to the microprocessor. The TX RF front end is connected to the microprocessor by using a voltage-controlled oscillator and a chirp parameter configurator, and receives a signal sent by the microprocessor.

Based on the foregoing difference between the radar sensors, a difference between the another radar system provided in this application and the foregoing radar system lies in the following: Because the radio frequency unit is connected to the microprocessor in a many-to-one manner or a one-to-one manner, a data combination unit is no longer required to combine echo data obtained by radio frequency units, and instead, the microprocessor directly receives the echo data sent by the radio frequency units, and the microprocessor sends preprocessed echo data to a central processing unit.

Further, for a remaining step of another radar system provided in this application, refer to the foregoing recorded content. Details are not described again in this embodiment of this application.

Working principles of the two radar systems provided in the embodiments of this application are described above in detail. In an actual use process, the radar systems provided in the embodiments of this application may have the following several specific implementations in the in-vehicle radar field based on different use scenarios and requirements. The specific implementations are described below in detail with reference to the accompanying drawings.

1. Same Radars are Arranged Around a Vehicle Body.

Figure 7:
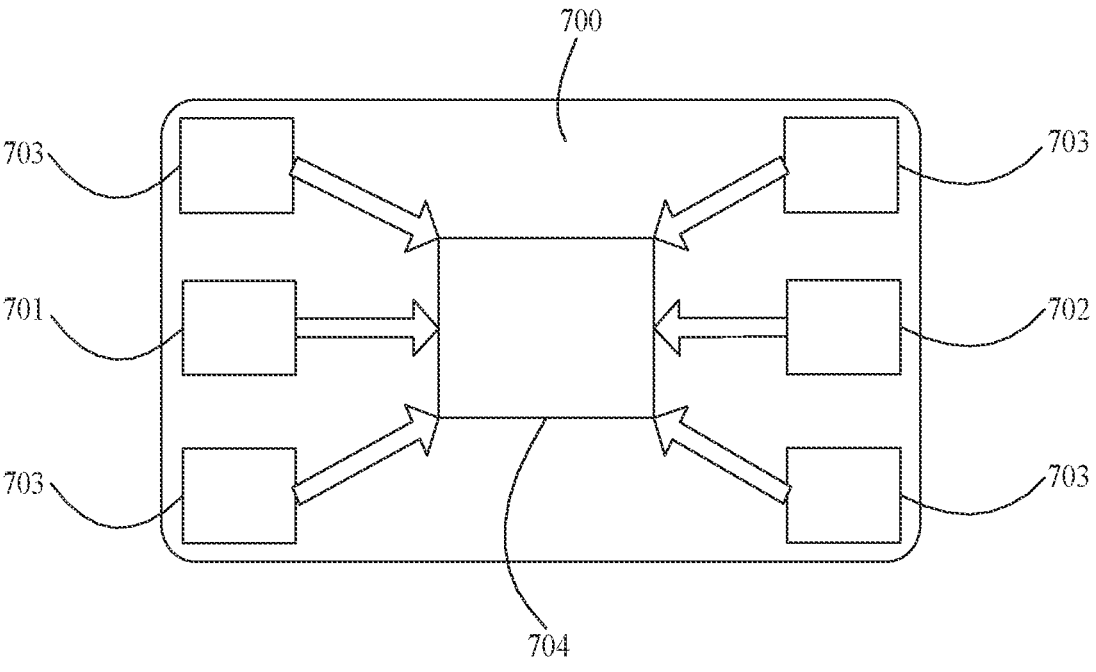
FIG. 7 is a schematic diagram of an implementation of a radar system according to an embodiment of the present disclosure.

As shown in FIG. 7, an in-vehicle radar system provided in a first specific implementation of this application includes a vehicle body 700, a central processing unit 704, and a total of six radar sensors: a forward radar sensor 701 disposed on a front side of the vehicle body, a backward radar sensor 702 disposed on a back side of the vehicle body, and angular radar sensors 703 disposed at four corners of the vehicle body. The forward radar sensor 701, the backward radar sensor 702, and the angular radar sensors 703 are separately connected to the central processing unit 704. The six radar sensors have a same structure, and each may be the radar sensor described in any one of the foregoing radar systems. For a specific structure of the radar sensor, and a specific working manner in which the radar sensor cooperates with the central processing unit 704 to process echo data, refer to the foregoing recorded content. Details are not described herein again.

Further, the central processing unit 704 may be a central RPU. A person skilled in the art may adjust a specific quantity of radar sensors and a disposing location of the radar sensor based on a requirement in an actual use process. This is not limited in this embodiment of this application.

In this embodiment, the radar sensor provided in this embodiment of this application is disposed around the vehicle body, and the radar sensor is connected to the central processing unit, to implement a multi-level domain data method provided in the embodiments of this application, so that a microprocessor in the radar sensor and the central processing unit share pressure of computing power for data processing, and a processing capability, a cache capability, and a data throughput capability of the radar system are improved to adapt to a huge amount of data brought by a radar sensor with a large-scale antenna array.

It should be noted that in some application scenarios, a relatively large detection range and a relatively high point cloud density are required for the forward and backward radar sensors in the radar system, but only a medium detection range and point cloud density are required for the angular radar. Therefore, differential processing may be performed on radar sensors in different detection directions in the radar system. This case is specifically described below.

2. Difference Radars are Arranged Around a Vehicle Body.

Figure 8:
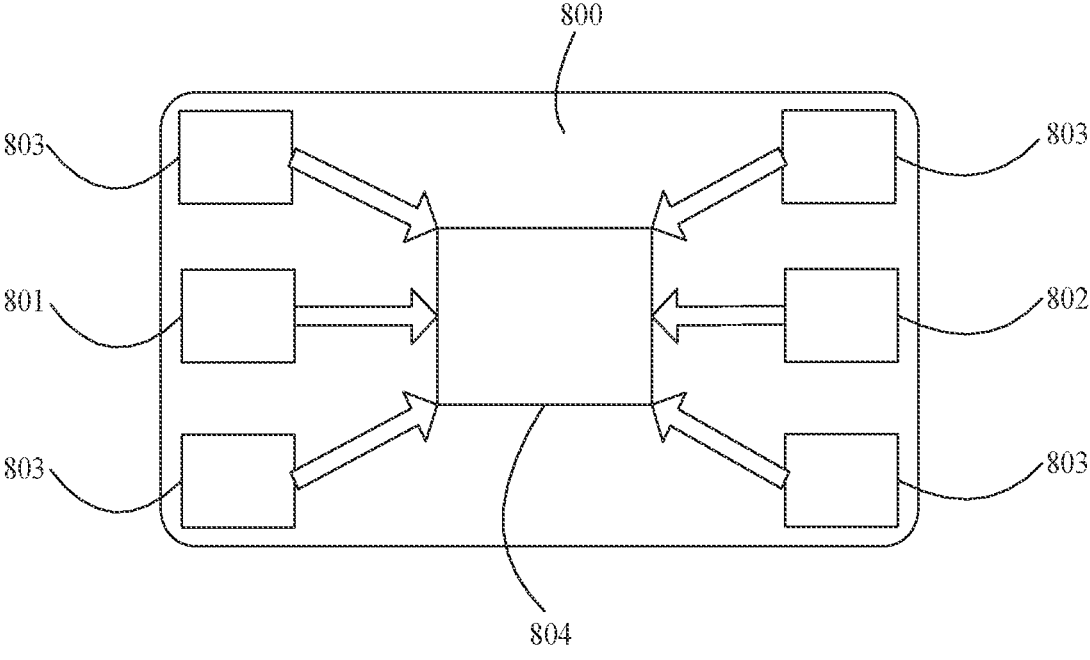
FIG. 8 is a schematic diagram of another implementation of a radar system according to an embodiment of the present disclosure.
Figure 9:
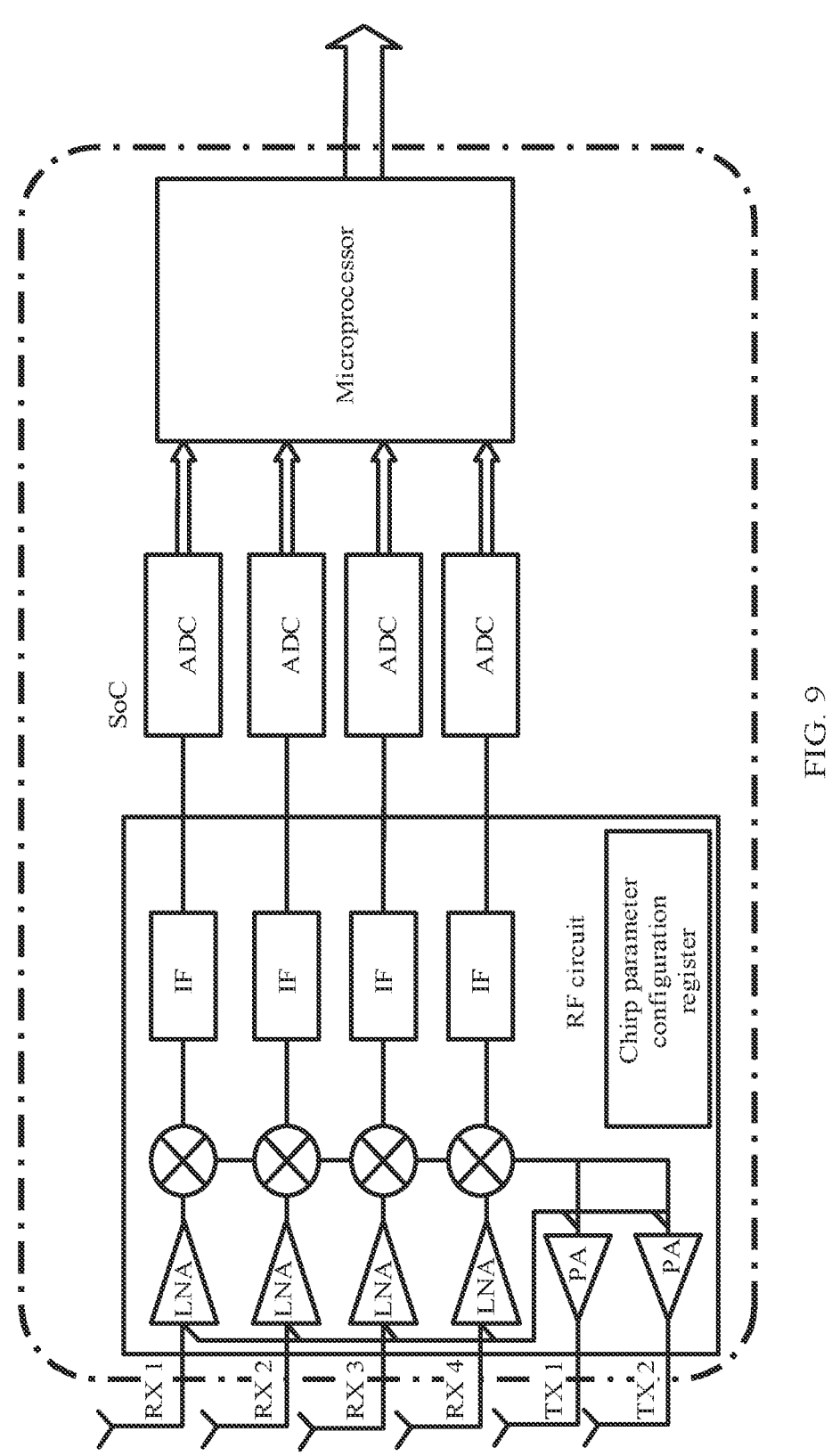
FIG. 9 is a schematic diagram of a radar sensor.

As shown in FIG. 8, an in-vehicle radar system provided in a second specific implementation of this application includes a vehicle body 800, a central processing unit 804, and a total of six radar sensors: a forward radar sensor 801 disposed on a front side of the vehicle body, a backward radar sensor 802 disposed on a back side of the vehicle body, and angular radar sensors 803 disposed at four corners of the vehicle body. The forward radar sensor 801, the backward radar sensor 802, and the angular radar sensors 803 are separately connected to the central processing unit 804. The forward radar sensor 801 and the backward radar sensor 802 each are the radar sensor provided in this embodiment of this application. For a specific structure, refer to the foregoing description. Details are not described herein again. The four angular radar sensors 803 each are a radar in the conventional technology. As shown in FIG. 9, the radar sensor may specifically include a radar monolithic chip. The radar monolithic chip includes a radio frequency unit, RF circuits such as a power amplifier (PA), a low noise amplifier (LNA), a mixer, and an intermediate frequency filter IF, and a chirp signal parameter configuration register. The radio frequency unit may include a transmit/receive antenna, for example, may include four receive antennas RX 1 to RX 4 and two transmit antennas TX 1 and TX 2, which form a 2-transmit 4-receive structure. Each receive antenna in the RX 1 to the RX 4 is connected to one LNA, and the LNAs each are sequentially connected to an IF and an ADC by using respective mixers. Finally, the ADCs are connected to a same microprocessor. The angular radar sensor only needs a medium detection range and point cloud density. Therefore, a data amount is relatively small, and the microprocessor can independently process echo data of the radar monolithic chip, including distance measurement processing, speed measurement processing, and angle measurement processing, and then send processed data to the central processing unit 804.

Figure 10:
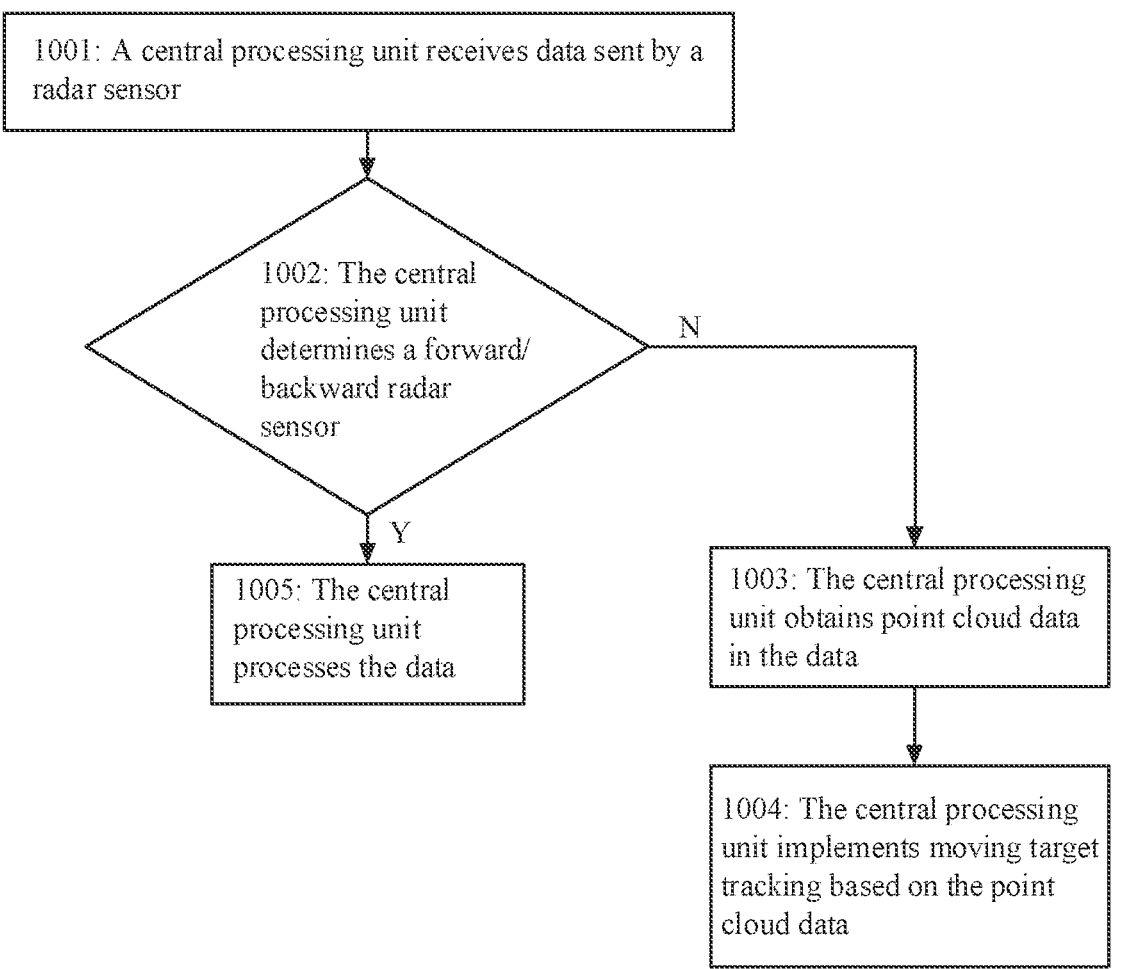
FIG. 10 is a diagram of a data processing procedure of a radar system according to an embodiment of the present disclosure.

Based on the foregoing architecture, in the in-vehicle radar system provided in FIG. 8, the forward radar sensor and the backward radar sensor each use the radar sensor provided in this embodiment of this application, and the angular radar uses the radar sensor in the conventional technology. Referring to FIG. 10, in the radar system provided in FIG. 8, processing performed on data by the central processing unit includes the following working steps.

1001. The central processing unit receives data sent by the radar sensor.

In this embodiment, the data may be combined data sent by a data combination module in the radar sensor, or may be data directly sent by a microprocessor in the radar sensor. For a specific working manner, refer to the foregoing description. Details are not described herein again.

Further, the central processing unit may receive, by using Ethernet, the data sent by the radar sensor.

1002. The central processing unit determines whether the received data is from the forward radar sensor or the backward radar sensor.

In this embodiment, when sending the data to the central processing unit, the radar sensor labels the sent data, so that the central processing unit can determine, based on the label, the radar sensor sending the data.

If the central processing unit determines that the received data is from neither the forward radar sensor nor the backward radar sensor, the central processing unit performs steps 1003 and 1004.

1003. The central processing unit obtains point cloud data in the data.

In this embodiment, the data received by the central processing unit is data processed by the angular radar sensor. Therefore, the central processing unit can directly obtain the point cloud data.

1004. The central processing unit implements moving target tracking based on the point cloud data.

In this embodiment, the central processing unit implements moving target tracking based on the point cloud data, to complete tracking of a scanned target.

If the central processing unit determines that the received data is from either the forward radar sensor or the backward radar sensor, the central processing unit performs step 1005.

1005. The central processing unit processes the data.

In this embodiment, the central processing unit may process data in a processing manner of any one of the central processing units that are disclosed in the radar systems provided in the embodiments of this application. For understanding, refer to the foregoing description. Details are not described herein again.

In this embodiment, for the forward and backward radar sensors, the central processing unit performs subsequent processing by using a processing procedure provided in this embodiment of this application. For the angular radar sensor, the central processing unit may obtain the point cloud data and perform subsequent moving target tracking processing. After performing differential processing on data of different radar sensors, the central processing unit performs 360-degree radar data convergence and heterogeneous sensor data convergence, to process different radar sensors disposed around the vehicle body based on an actual requirement, so as to adapt to different use requirements and reduce computing power.

It should be noted that in addition to a radar system, the technical solution provided in the embodiments of this application may also be applied to another electronic processing system similar to a topology structure, so that the system is compatible with a plurality of peripheral configurations by using flexible configuration of a processing task and a processing mode. A standardized and miniaturized distributed processing unit cooperates with a powerful central processing unit to implement software upgrade of the system.

It may be clearly understood by a person skilled in the art that for the purpose of convenient and brief description, for a detailed working process of the foregoing terminal, reference may be made to a corresponding process in the foregoing method embodiments, and details are not described herein again.

In the several embodiments provided in this application, it should be understood that the disclosed system, apparatus, and method may be implemented in another manner. For example, the described apparatus embodiment is merely an example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected depending on actual requirements to achieve the objectives of the solutions in the embodiments.

In addition, function units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computerreadable storage medium. Based on such an understanding, the technical solutions of this application essentially, or the part contributing to the current technology, or all or some of the technical solutions may be implemented in the form of a software product. The computer software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a Universal Serial Bus (USB) flash drive, a removable hard disk, a read-only memory (ROM), a random-access memory (RAM), a magnetic disk, or an optical disc.

The charging pile provided in the embodiments of the present disclosure are described in detail above. The principle and implementation of the present disclosure are described herein by using specific examples. The description about the embodiments of the present disclosure is merely provided to help understand the method and core ideas of the present disclosure. In addition, a person of ordinary skill in the art can make variations and modifications to the present disclosure in terms of the specific implementations and application scopes according to the ideas of the present disclosure. Therefore, the content of specification shall not be construed as a limit to the present disclosure.

What is claimed is:

1. A radar system, comprising:
a radar sensor comprising:
    a plurality of radar monolithic chips, wherein each of the radar monolithic chips comprises:
    a radio frequency unit configured to receive echo data; and
    a microprocessor coupled to the radio frequency unit and configured to preprocess the echo data by performing downsampling on X digital chirp signals received from the radio frequency unit to obtain first data comprising Y digital chirp signals, wherein both X and Y are positive integers greater than one, and wherein Y is less than X; and
    a data combination module, comprising:
    a processor configured to combine the first data of each of the radar monolithic chips to obtain combined data of the radar sensor; and
    a communication interface coupled to the processor and configured to transmit the combined data; and
a central processing unit configured to perform post-processing on the combined data to obtain second data, wherein the second data are configured to generate point cloud information of the radar system.

2. The radar system of claim 1, wherein the data combination module is further configured to transmit the combined data to the central processing unit.

3. The radar system of claim 2, wherein in a manner to combine the first data, the data combination module is further configured to package the first data when a signal transmission bit width between the data combination module and the central processing unit is greater than or equal to a bit width of the combined data.

4. The radar system of claim 2, wherein when a signal transmission bit width between the data combination module and the central processing unit is less than a bit width of the combined data, in a manner to combine the first data, the data combination module is further configured to:
    convert the first data from parallel data into serial data;
    cache the serial data; and transmit the serial data to the central processing unit N times, wherein N is an integer greater than one.

5. The radar system of claim 2, wherein the central processing unit is further configured to perform speed measurement processing and angle measurement processing on the combined data to obtain measured speed data and measured angle data of the radar sensor.

6. The radar system of claim 2, wherein the radio frequency unit is further configured to:
    send a first digital chirp signal to perform detection; and
    receive, in response to sending the first digital chirp signal, a second digital chirp signal.

7. The radar system of claim 6, wherein the central processing unit is further configured to perform speed measurement processing and angle measurement processing on the second digital chirp signal.

8. The radar system of claim 6, wherein the data combination module is further configured to combine third digital chirp signals of each of the radar monolithic chips to obtain the combined data, and wherein the central processing unit is configured to perform post-processing on the third digital chirp signal in the combined data to obtain the second data.

9. The radar system of claim 1, wherein in a manner to preprocess the echo data, the microprocessor is further configured to compress the echo data to obtain first compressed data, wherein the data combination module is further configured to combine the first compressed data of each of the radar monolithic chips to obtain compressed combined data of the radar sensor, and wherein the central processing unit is further configured to decompress the compressed combined data.

10. The radar system of claim 1, wherein the central processing unit comprises a central radar-signal processing unit (RPU).

11. The radar system of claim 1, wherein each radar monolithic chip is a system on chip (SoC).

12. The radar system of claim 1, wherein the microprocessor is a radar-signal processing unit (RPU).

13. The radar system of claim 1, wherein the radar system comprises a plurality of radar sensors, and wherein the second data of the plurality of radar sensors is combined to generate the point cloud information.

14. A radar system, comprising:
a radar sensor comprising:
a radio frequency unit configured to receive echo data; and
a microprocessor coupled to the radio frequency unit and configured to:
    preprocess the echo data by performing downsampling on X digital chirp signals received from the radio frequency unit to obtain first data comprising Y digital chirp signals, wherein both X and Y are positive integers greater than one, and wherein Y is less than X; and
    transmit the first data; and
a central processing unit configured to perform post-processing on the first data to obtain second data, wherein the second data are configured to generate point cloud information of the radar system.

15. The radar system of claim 14, wherein the microprocessor is further configured to transmit the first data to the central processing unit.

16. The radar system of claim 14, wherein the central processing unit is further configured to perform speed measurement processing and angle measurement processing on the first data to obtain measured speed data and measured angle data of the radar sensor.

17. The radar system of claim 14, wherein the radio frequency unit is further configured to:

send a first digital chirp signal to perform detection; and receive, in response to sending the first digital chirp signal, a second digital chirp signal.

18. The radar system of claim 14, wherein in a manner to preprocess the echo data, the microprocessor is further configured to compress the echo data to obtain compressed data, and wherein the central processing unit is further configured to decompress the compressed data.

19. The radar system of claim 14, wherein the microprocessor is a radar-signal processing unit (RPU).

20. The radar system of claim 14, wherein the central processing unit comprises a central radar-signal processing unit (RPU).

* * * * *